United States Patent
Wyler

(10) Patent No.: US 7,047,033 B2
(45) Date of Patent: May 16, 2006

(54) METHODS AND APPARATUS FOR ANALYZING, PROCESSING AND FORMATTING NETWORK INFORMATION SUCH AS WEB-PAGES

(75) Inventor: Eran Shmuel Wyler, Modi'in (IL)

(73) Assignee: Infogin LTD, Rosh Ha' Ain (IL)

( * ) Notice: Subject to any disclaimer, the term of this patent is extended or adjusted under 35 U.S.C. 154(b) by 805 days.

(21) Appl. No.: 09/773,098

(22) Filed: Jan. 31, 2001

(65) Prior Publication Data

US 2005/0055420 A1 Mar. 10, 2005

Related U.S. Application Data

(60) Provisional application No. 60/253,364, filed on Nov. 27, 2000, provisional application No. 60/228,599, filed on Aug. 28, 2000, provisional application No. 60/179,532, filed on Feb. 1, 2000.

(51) Int. Cl.
    *H04M 1/00* (2006.01)
(52) U.S. Cl. ............... 455/552.1; 455/557; 455/556.2; 455/566
(58) Field of Classification Search ............... 455/566, 455/556.1, 556.2, 557, 552.1
    See application file for complete search history.

(56) References Cited

U.S. PATENT DOCUMENTS

| | | | |
|---|---|---|---|
| 5,860,073 A | 1/1999 | Ferrel et al. | 707/522 |
| 5,909,568 A | 6/1999 | Nason | 395/500 |
| 6,023,714 A | 2/2000 | Hill et al. | 707/513 |
| 6,157,935 A * | 12/2000 | Tran et al. | 715/503 |
| 6,199,082 B1 | 3/2001 | Ferrel et al. | 707/522 |
| 2001/0032234 A1* | 10/2001 | Summers et al. | 709/201 |
| 2002/0090114 A1* | 7/2002 | Rhoads et al. | 382/100 |
| 2004/0093376 A1* | 5/2004 | De Boor et al. | 709/203 |
| 2005/0122997 A1* | 6/2005 | Bendelac et al. | 370/477 |

OTHER PUBLICATIONS

Spyglass Prism, Concepts and Applications, Spyglass Inc., 1997, pp. 1-7.
http://www.w3.org/protocols/HTTP/HTRO_Headers.html.

* cited by examiner

*Primary Examiner*—Temica Beamer
(74) *Attorney, Agent, or Firm*—Ladas & Parry

(57) ABSTRACT

A method for processing information received by a wireless device over a computer network, including receiving information from at least one source of information over a computer network, parsing at least some of the information, and employing at least some results of the parsing to provide the information in a form suitable for display to a user on the wireless device.

16 Claims, 36 Drawing Sheets

FIG. 2
PRIOR ART

UART, 220
V.22, 114
SCSI, 24
SPS, 67
BIOS, 47
UART, 320
BIOS, 48
UART, 223
SPA, 120

UART, 220, 320, 223
V.22, 114
SCSI, 24
SPS, 67, 120
BIOS, 47, 48

BIOS, 47, 48
SCSI, 24
UART, 220, 223, 320
V.22, 114

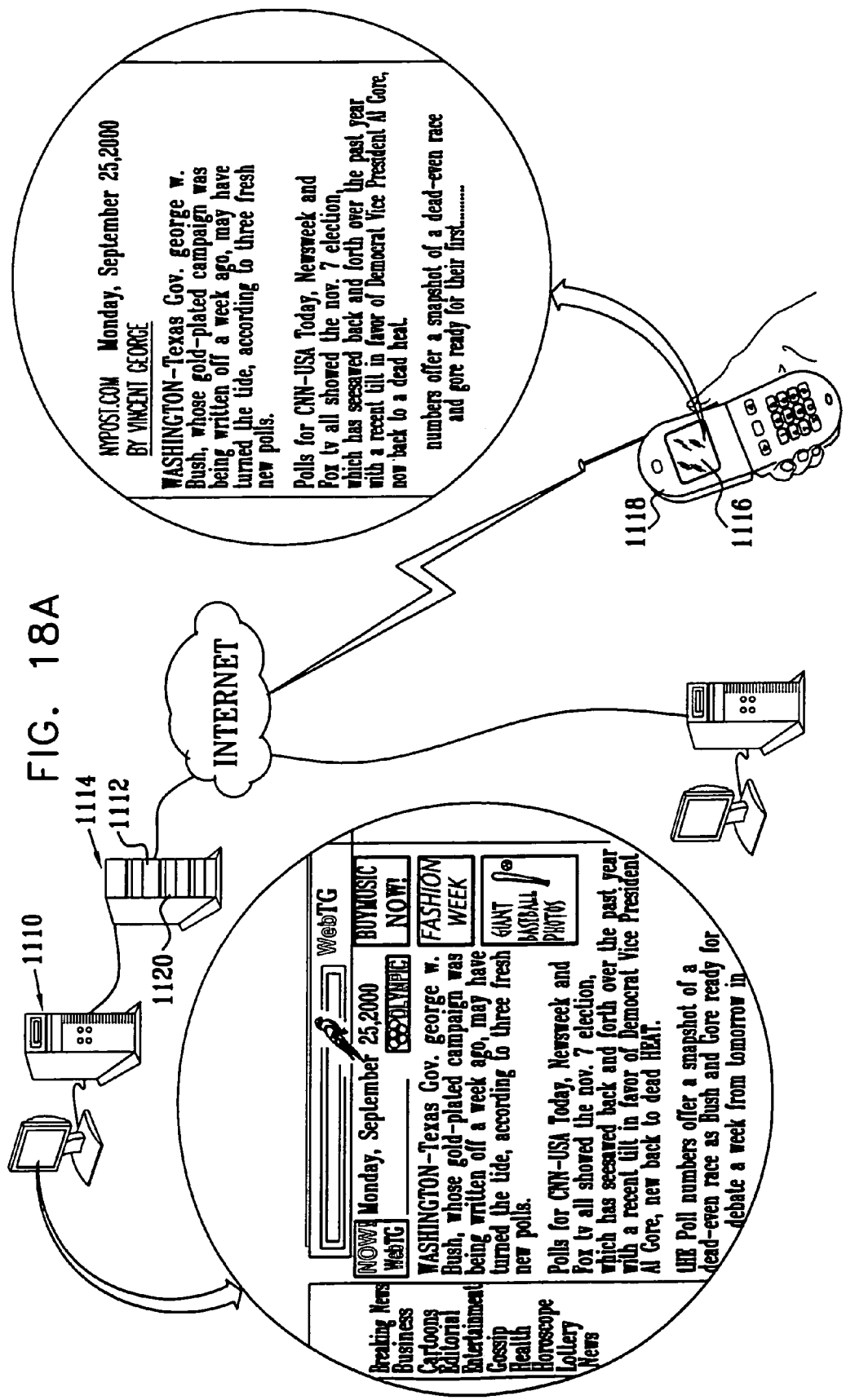

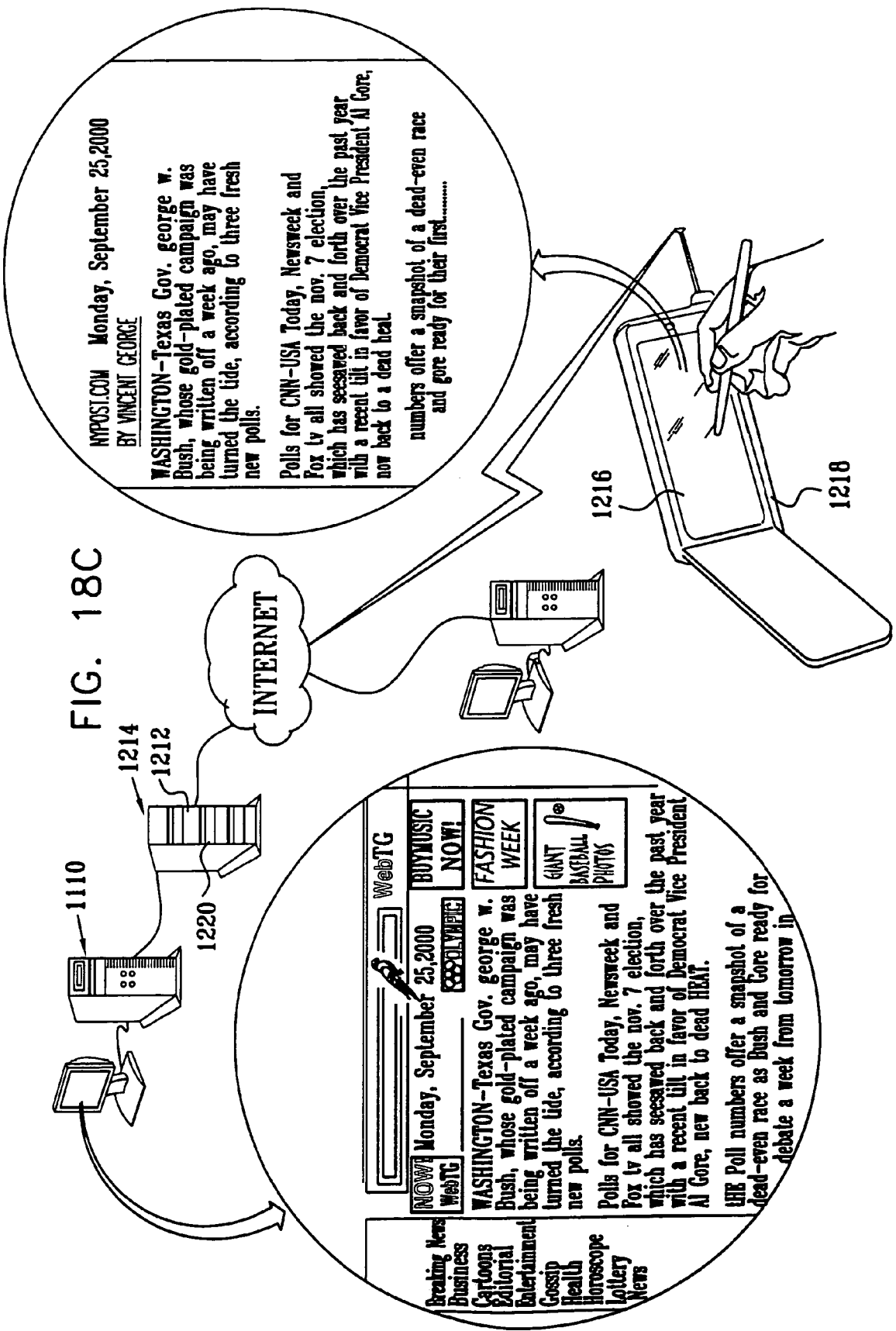

FIG. 28
(PRIOR ART)

NEWS NYPOST.COM
Email Updates
Make NYPOST.COM Your Homepage

HOME NEWS|COLUMNISTS|SPORTS|GOSSIP|POST OPINION|BUSINESS|ENTERTAINMENT

WebMD

WebMD

Home
Archives
Last 7 Days
Business
Cartoons
Classified
Columnists
Entertainment
Gossip
Horoscope
Lifestyle
Lottery
Marketplace
News
PageSix.com
Post Opinion
Puzzles
Real Estate
Reviews
Sports
Story Index
Traffic
Travel
TV Listings

WEATHER

Enter Zip or City, State
Example: New York, NY

SEARCH

Web
Find it!

Career
Opportunities
Comments
Contact Us
Home Delivery
How to Advertise
Newscorp Sites
Post History
Privacy Policy
Terms of Use

FORMER NYC MAYOR JOHN VLIET LINDSAY DEAD AT 79
Wednesday, December 20, 2000

By ROBERT HARDT Jr.

JOHN V. LINDSAY
(1921-2000)
-NYP: M. Narcia

John V. Lindsay, the charismatic "Silk Stocking" Republican turned Democrat who led New York City through eight tumultuous years as mayor, died yesterday in a South Carolina retirement community.

Lindsay, 79, had been in poor health over the last several years, battling Parkinson's Disease and suffering two heart attacks and two strokes.

Lindsay -- mayor from 1966 to 1974 -- was widely credited for maintaining racial unity in New York during a time in which other cities across the country were torn apart by upheaval and riots.

"His contribution was infusing a spirit into young people to go into government," said ex-mayor Edward I. Koch, who crossed party lines to endorse a then-Republican Lindsay in 1965. "He brought a sense that the government belonged to the people."

City Council member Ronnie Eldridge, who served as Lindsay's special assistant at City Hall from 1969 to 1973, called the late mayor "a graceful, thoughtful, caring person who worked very hard."

Lindsay was mayor "during exciting times, and really started the national effort to form an urban agenda that would help cities grow in a very healthful way," she recalled.

WHO WILL WIN GRAMMY

SPECIAL PROMOTIONS

PAGE SIX .COM

FIG. 31A

| KEY | COLUMN NAME | TYPE | LENGTH BYTES | PRECISION | ALLOW NULLS | DEFAULT | REMARK |
|---|---|---|---|---|---|---|---|
| 1 | USER ID | INT | 4 | 0 | 0 | | AUTO GENERATED |
| 0 | USER NAME | CHAR | 10 | 0 | 0 | | 4 TO 30, CASE INSENSITIVE, BOTH CLIENT ENFORCED. |
| 0 | PASSWORD | CHAR | 10 | 0 | 0 | | MINIMUM 6 CLIENT ENFORCED. UP TO 12, CASE SENSITIVE |
| 0 | EMAIL | VARCHAR | 50 | 0 | 0 | | |
| 0 | COUNTRY | VARCHAR | 20 | 0 | 1 | | |
| 0 | ZIP | CHAR | 10 | 0 | 1 | | |
| 0 | FIRST NAME | VARCHAR | 20 | 0 | 1 | | |
| 0 | LAST NAME | VARCHAR | 20 | 0 | 1 | | |
| 0 | GENDER | TINYINT | 1 | 3 | 1 | | |
| 0 | AGE | TINYINT | 1 | 3 | 1 | | |
| 0 | OCCUPATION | TINYINT | 1 | 3 | 1 | | |
| 0 | INCOME | TINYINT | 1 | 3 | 1 | | |
| 0 | INTERESTS | BINARY | 10 | 0 | 1 | | |
| 0 | INTERESTS ANALISYS | CHAR | 10 | 0 | 0 | | OUTCOME OF USER USAGE ANALYSIS |
| 0 | REGDATE TIME ANALISYS | DATE TIME | 8 | 0 | 0 | TIME STAMP | SYSTEM DATE TIME |

FIG. 31B

| KEY | COLUMN NAME | TYPE | LENGTH | PRECISION | ALLOW NULLS | DEFAULT | REMARK |
|---|---|---|---|---|---|---|---|
| K | USER ID | INT | 4 | 0 | 0 | | |
| K | REQUEST ID | INT | 4 | 10 | 0 | | |
| 0 | URL | VARCHAR | 500 | 0 | 0 | 0 | |
| 0 | EMAIL | VARCHAR | 500 | 0 | 0 | 1 | |
| 0 | DOC TITLE | VARCHAR | 50 | 0 | 0 | 1 | |
| 0 | KEYWORDS | VARCHAR | 500 | 0 | 0 | 1 | |
| 0 | SITE PASSWORD | VARCHAR | 10 | 0 | 0 | 1 | |
| K | SITE USER NAME | VARCHAR | 20 | 0 | 0 | 1 | |
| 0 | RETRIEVE DEPTH | TINYINT | 1 | 3 | 0 | 1 | |
| 0 | COMPRESSION | TINYINT | 1 | 3 | 0 | 1 | |
| 0 | TRANSMISSION | TINYINT | 1 | 3 | 0 | 1 | |
| 0 | MAX EMAIL SIZE | TINYINT | 1 | 0 | 0 | 1 | |
| 0 | STATE | TINYINT | 1 | 0 | 0 | 1 | |
| 0 | STATUS | TINYINT | 1 | 0 | 0 | 1 | |
| 0 | REQUEST DATE TIME | DATE TIME | 8 | 0 | 0 | 1 | (GETDATE()) |

| KEY | COLUMN NAME | TYPE | LENGTH | PRECISION | ALLOW NULLS | DEFAULT | REMARK |
|---|---|---|---|---|---|---|---|
| K | USER ID | INT | 4 | 0 | 0 | | |
| | PREFERENCES | STRING | 500 | 0 | 1 | | USER PREFERENCES |

| KEY | COLUMN NAME | TYPE | LENGTH | PRECISION | ALLOW NULLS | DEFAULT | REMARK |
|---|---|---|---|---|---|---|---|
| K | USER ID | INT | 4 | 0 | 0 | | |
| K | REQUEST ID | INT | 4 | 0 | 0 | | |
| | PREFERENCES | STRING | 500 | 0 | 1 | | REQUEST PREFERENCES |

```
─ 89 (!)
⊟ 90 (TBODY)
  ⊟ 91 (TR)
    ⊞ 92 (TD)=1722
      ─ 466 (!)
    ⊞ 467 (TD)
    ⊟ 469 (TD)=1725
      ─ 470 (!)
      ─ 471 (!)
      ⊞ 472 (TABLE)
      ⊞ 476 (A)
      ─ 478 (Text)
      ⊞ 479 (TABLE)
      ⊟ 483 (TABLE)
        ⊟ 484 (TBODY)
          ⊟ 485 (TR)
            ⊞ 486 (TD)
    ⊟ 488 (TABLE)
      ⊟ 489 (TBODY)
        ⊟ 490 (TR)
          ⊞ 491 (TD)
          ⊟ 493 (TD)=1724
            ─ 494 (!)
            ⊟ 495 (TABLE)
              ⊟ 496 (TBADY)
                ⊟ 497 (TR)
                  ⊟ 498 (TD)
                    ⊞ 499 (CENTER)
                    ⊞ 524 (TABLE)=1726
                    ─ 539 (BR)
                    ⊞ 540 (SPAN)
                      ─ 631 (!)
                      ⊞ 632 (A)
                      ─ 635 (Text)
            ─ 636 (BR)
            ⊞ 637 (TABLE)
            ─ 649 (SCRIPT)
            ─ 650 (IMC)
            ─ 651 (TextT)
            ─ 652 (NOSCRIPT)
            ⊞ 653 (P)
            ─ 658 (P)
            ⊞ 659 (P)
          ─ 748 (!)
    ⊞ 749 (TD)
    ⊞ 751 (TD)=1723
```

FIG. 35

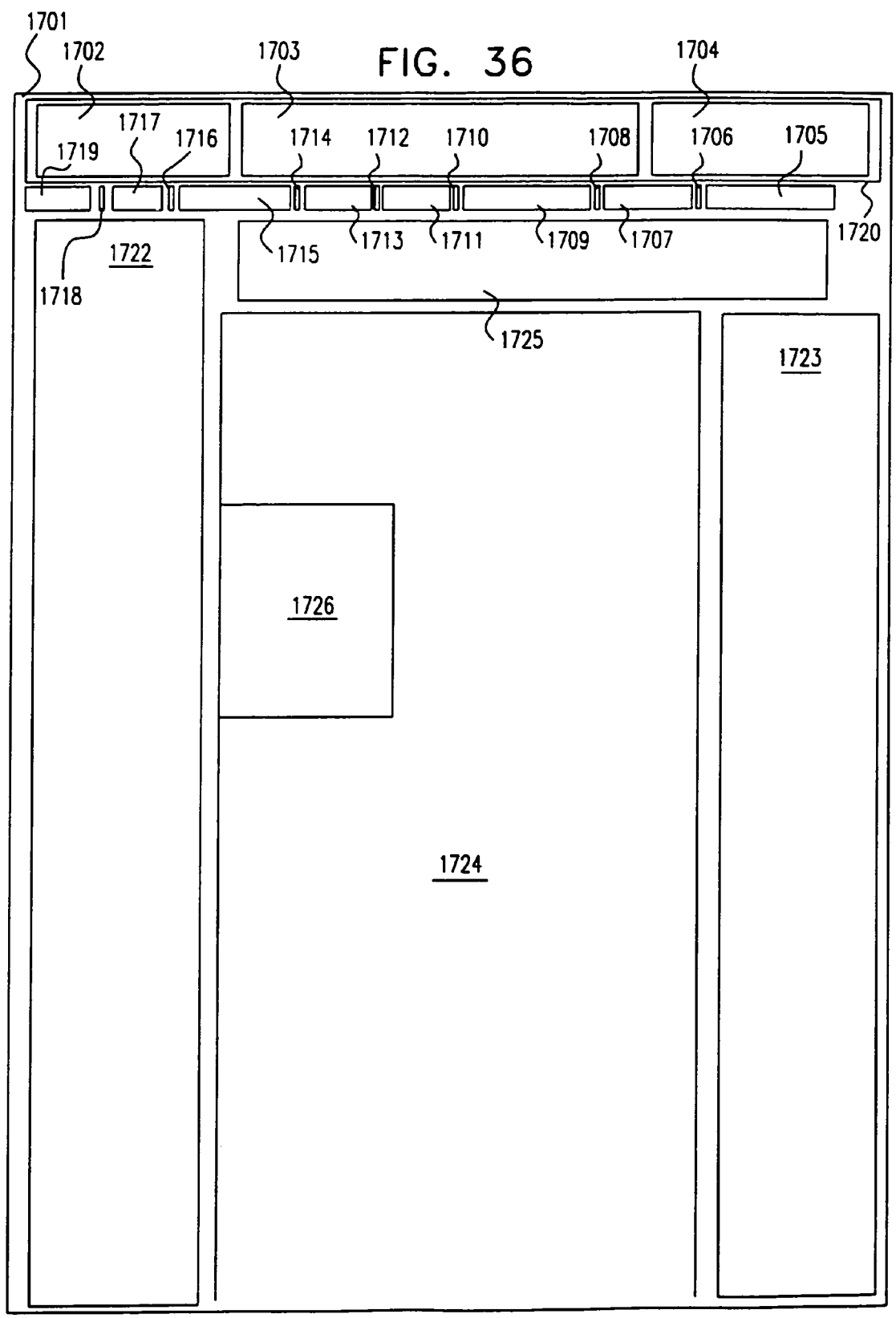

METHODS AND APPARATUS FOR ANALYZING, PROCESSING AND FORMATTING NETWORK INFORMATION SUCH AS WEB-PAGES

This application claims the benefit of U.S. Provisional Application(s) No(s).: 60/179,532 Feb. 1, 2000, 60/228,599 Aug. 28, 2000, 60/253,364 Nov. 27, 2000 and incorporates the same by reference.

REFERENCE TO COMPUTER PROGRAM LISTING APPENDIX

Computer program listing appendices are submitted herewith on one compact disc and one duplicate compact disc. The total number of compact discs including duplicates is two. The files on the compact disc are software object code and accompanying files for carrying out two preferred embodiment of the invention. Their names, dates of creation, directory locations, and sizes in bytes are:
1. Directory apndx-I containing file IMP.HEX (Appendix I) of Jan. 22, 2001 and of length 2,395,518 bytes.
2. Directory apndx-II containing file BOOKGEN.HEX (Appendix II) of Jan. 22, 2001 and of length 22,899,965 bytes.

The files are referred to herein as appendices I and II, respectively. The material on the compact discs is incorporated by reference herein.

FIELD OF THE INVENTION

The present invention relates generally to information processing systems and methodologies and more particularly to systems and methodologies for processing information received over the Internet.

BACKGROUND OF THE INVENTION

The disclosures of all publications mentioned in the specification and of the publications cited therein are hereby incorporated by reference.

Although the Internet has gained recognition as an important or even the most important repository of information, information received from sites on the World Wide Web is often presented in a form which is less than optimal to a user, particularly when that information is received in hard copy without the benefit of Hypertext links or over a wireless device with screen size limitations.

SUMMARY OF THE INVENTION

The present invention seeks to provide a system and methodology for organization and presentation of information received over the Internet.

There is thus provided in accordance with a preferred embodiment of the present invention a method for processing information received by a wireless device over a computer network, the method includes receiving information from at least one source of information over a computer network, parsing at least some of the information and employing at least some results of the parsing to provide the information in a form suitable for display to a user on the wireless device.

Further in accordance with a preferred embodiment of the present invention the wireless device is a wireless telephone and at least some results of the parsing are employed to provide the information in a form suitable for display to a user on the telephone.

Still further in accordance with a preferred embodiment of the present invention the wireless device is a wireless personal digital assistant and at least some results of the parsing are employed to provide the information in a form suitable for display to a user on the personal digital assistant.

Alternatively the wireless device is a wireless telephone and personal digital assistant and at least some results of the parsing are employed to provide the information in a form suitable for display to a user on the telephone and personal digital assistant.

Furthermore in accordance with a preferred embodiment of the present invention at least some of the results of parsing are employed for classifying the information according to its importance to a user in accordance with user selected importance criteria and the display of the information is at least partially in accordance with results of the classifying of the information.

Preferably at least some of the results of the parsing are employed for classifying the information according to its importance to a user in accordance with user selected importance criteria and the display of the information is at least partially in accordance with results of the classifying of the information.

Additionally or alternatively at least some of the results of the parsing are employed for classifying the information according to its importance to a user in accordance with user selected importance criteria and the display of the information is at least partially in accordance with results of the classifying of the information.

Additionally in accordance with a preferred embodiment of the present invention at least the parsing takes place at a server interconnecting the source of the information with the wireless device.

Additionally the parsing may take place at a server interconnecting the source of the information with the wireless a device. Alternatively, the parsing may take place at the wireless device.

There is also provided in accordance with yet another preferred embodiment of the present invention a system for processing information received by a wireless device over a computer network. The system includes a retriever for for receiving information from at least one source of information over a computer network and a parser for parsing at least some of the information and a display engine, employing at least some results of the parsing to provide the information in a form suitable for display to a user on the wireless device.

Further in accordance with a preferred embodiment of the present invention the wireless device is a wireless telephone and at least some results of the parsing are employed to provide the information in a form suitable for display to a user on the telephone.

Still further in accordance with a preferred embodiment of the present invention the wireless device is a wireless personal digital assistant and at least some results of the parsing are employed to provide the information in a form suitable for display to a user on the personal digital assistant.

Alternatively the wireless device is a wireless telephone and personal digital assistant and at least some results of the parsing are employed to provide the information in a form suitable for display to a user on the telephone and personal digital assistant.

Furthermore in accordance with a preferred embodiment of the present invention at least some of the results of the parsing are employed for classifying the information according to its importance to a user in accordance with user selected importance criteria and the display of the information is at least partially in accordance with results of the classifying of the information.

Further in accordance with a preferred embodiment of the present invention at least the parsing takes place at a server interconnecting the source of the information with the wireless device.

There is also provided in accordance with yet another preferred embodiment of the present invention a method for processing information received over a computer network. The method includes receiving information from at least one source of information over a computer network parsing at least some of the information and employing at least some results of the parsing to provide a user sensible directory of the information.

Further in accordance with a preferred embodiment of the present invention the sensor sensible directory is an outline.

Still further in accordance with a preferred embodiment of the present invention the user sensible directory is a table of contents.

Further in accordance with a preferred embodiment of the present invention the user sensible directory is an index.

Preferably the parsing step includes parsing Java script.

Moreover in accordance with a preferred embodiment of the present invention the parsing step includes parsing a mark-up language.

There is thus provided in accordance with yet another preferred embodiment of the present invention a method for processing information received over a computer network, the method includes receiving information from at least one source of information over a computer network, parsing at least some of the information and employing at least some results of the parsing to automatically eliminate at least a preselected category of the information.

Further in accordance with a preferred embodiment of r the present invention the preselected category of the information includes advertisements.

Still further in accordance with a preferred embodiment of the present invention the preselected category of the information includes references to other information.

Additionally in accordance with a preferred embodiment of the present invention the method also includes employing at least some results of the parsing to provide a user sensible directory of the information.

Preferably the method also includes employing at least some results of the parsing to provide a user sensible directory of the information.

Moreover in accordance with a preferred embodiment of the present invention the method the parsing step includes parsing Java script.

Additionally the parsing step may also include parsing a mark-up language.

There is further provided in accordance with yet another preferred embodiment of the present invention a method for processing information received over a computer network. The method includes receiving information from at least one source of information over a computer network, parsing at least some of the information and employing at least some results of the parsing to differentiate at least one general information portion thereof from at least one specific information portion thereof and to present the at least one general information portion separately from the at least one specific information portion.

Further in accordance with a preferred embodiment of the present invention, the method includes employing step pre-sents the at least one general information portion before the at least one specific information portion.

Furthermore in accordance with a preferred embodiment of the present invention the method also includes employing at least some results of the parsing to provide a user sensible directory of the information.

Preferably the method employs at least some results of the parsing to provide a user sensible directory of the information.

Additionally in accordance with a preferred embodiment of the present invention the method also includes employing at least some results of the parsing to automatically eliminate at least a preselected category of the information.

Further in accordance with a preferred embodiment of the present invention the parsing step includes parsing Java script.

Additionally the parsing step includes parsing a mark-up language.

There is thus provided in accordance with another preferred embodiment of the present invention a method for interacting with a user as he surfs the Internet. The method includes enabling the user to surf the Internet using a web browser and to print information retrieved from the Internet, providing the user with a client application which communicates via the Internet with an external server, enabling the client application to inform the external server of data regarding information printed by the user and employing the external server to provide personal profile information regarding the user.

Further in accordance with a preferred embodiment of the present invention the method also includes the step of transmitting information to the user via the client application based on the personal profile information.

Still further in accordance with a preferred embodiment of the present invention the method includes employing the client application for: receiving information from at least one source of information over a computer network, parsing at least some of the information and employing at least some results of the parsing to provide a user sensible directory of the information.

Furthermore in accordance with a preferred embodiment of the present invention the method includes employing the client application for: receiving information from at least one source of information over a computer network, parsing at least some of the information and employing at least some results of the parsing to automatically eliminate at least a preselected category of the information.

Still further in accordance with a preferred embodiment of the present invention the method includes employing the client application for: receiving information from at least one source of information over a computer network, parsing at least some of the information and employing at least some results of the parsing to provide differentiate at least one general information portion thereof from at least one specific information portion thereof and to present the at least one general information portion separately from the at least one specific information portion.

There is yet provided in accordance with another preferred embodiment of the present invention a method for processing information received over a computer network, the method includes receiving information from at least one source of information over a computer network, parsing at least some of the information and employing at least some results of the parsing to provide the information to a user in a changed presentation format.

Further in accordance with a preferred embodiment of the present invention the employing step presents at least one general information portion before at least one specific information portion.

Still further in accordance with a preferred embodiment of the present invention the method includes employing at least some results of the parsing to provide a user sensible directory of the information.

Further in accordance with a preferred embodiment of the present invention the method also includes employing at least some results of the parsing to automatically eliminate at least a preselected category of the information.

Preferably the parsing step includes parsing Java script.

Additionally the parsing step may also include parsing a mark-up language.

There is further provided in accordance with yet another preferred embodiment of the present invention a system for processing information received over a computer network including a parser for parsing information from at least one source of information over a computer network and a director generator, employing at least some results of the parsing, to provide a user sensible directory of the information.

Further in accordance with a preferred embodiment of the present invention the user sensible directory is an outline.

Still further in accordance with a preferred embodiment of the present invention the user sensible directory is a table of contents.

Furthermore in accordance with a preferred embodiment of the present invention the user sensible directory is an index.

Moreover in accordance with a preferred embodiment of the present invention the parser parses Java script.

Additionally in accordance with a preferred embodiment of the present invention the parser parses a mark-up language.

There is yet provided in accordance with another preferred embodiment of the present invention a system for processing information received over a computer network. The system includes a parser, parsing information received from at least one source of information over a computer network and an eliminator, employing at least some results of the parsing to automatically eliminate at least a preselected category of the information.

Further in accordance with a preferred embodiment of the present invention the preselected category of the information includes advertisements.

Still further in accordance with a preferred embodiment of the present invention the preselected category of the information includes references to other information.

Furthermore in accordance with a preferred embodiment of the present invention the system also includes a directory generator employing at least some results of the parsing to provide a user sensible directory of the information.

Additionally in accordance with a preferred embodiment of the present invention the parser provides parsing of Java script.

Moreover in accordance with a preferred embodiment of the present invention the parser provides parsing of a mark-up language.

There is further provided in accordance with yet another preferred embodiment of the present invention a system for processing information received over a computer network. The system includes parsing information received from at least one source of information over a computer network and a differentiator, employing at least some results of the parsing to differentiate at least one general information portion thereof from at least one specific information portion thereof and to present the at least one general information portion separately from the at least one specific information portion.

Further in accordance with a preferred embodiment of the present invention the at least one general information portion before the at least one specific information portion.

Still further in accordance with a preferred embodiment of the present invention the system also includes a director generator, employing at least some results of the parsing to provide a user sensible directory of the information.

Furthermore in accordance with a preferred embodiment of the present invention the system also includes an eliminator, employing at least some results of the parsing to automatically eliminate at least a preselected category of the information.

Further in accordance with a preferred embodiment of the present invention the parser provides parsing Java script.

Furthermore in accordance with a preferred embodiment of the present invention the parser provides parsing a mark-up language.

There is yet provided in accordance with another preferred embodiment of the present invention a system for interacting with a user as he surfs the Internet including a web browser operative to print information retrieved from the Internet, a client application which communicates via the Internet with an external server, an informant, enabling the client application to inform the external server of data regarding information printed by the user. The external server typically provides personal profile information regarding the user.

Further in accordance with a preferred embodiment of the present invention the information is transmitted to the user via the client application based on the personal profile information.

Still further in accordance with a preferred embodiment of the present invention the client application is operative for: receiving information from at least one source of information over a computer network, parsing at least some of the information and employing at least some results of the parsing to provide a user sensible directory of the information.

Additionally in accordance with a preferred embodiment of the present invention the client application is also operative for: receiving information from at least one source of information over a computer network, parsing it least some of the information and employing at least some results of the parsing to automatically eliminate at least a preselected category of the information.

Further in accordance with a preferred embodiment of the present invention the client application is operative for: receiving information from at least one source of information over a computer network, parsing at least some of the information and employing at least some results of the parsing to provide differentiate at least one general information portion thereof from at least one specific information portion thereof and to present the at least one general information portion separately from the at least one specific information portion.

Still further in accordance with a preferred embodiment of the present invention the system includes parsing information received from at least one source of information over a computer network and a presenter, employing at least some results of the parsing to provide the information to a user in a changed presentation format.

Additionally in accordance with a preferred embodiment of the present invention the presenter presents at least one general information portion before at least one specific information portion.

Furthermore in accordance with a preferred embodiment of the present invention the system also includes a directory generator employing at least some results of the parsing to provide a user sensible directory of the information.

Further in accordance with a preferred embodiment of the present invention the system also includes an eliminator, employing at least some results of the parsing to automatically eliminate at least a preselected category of the information.

Further in accordance with a preferred embodiment of the present invention the parser provides parsing of Java script.

Furthermore in accordance with a preferred embodiment of the present invention the parser provides parsing of a mark-up language.

There is thus provided in accordance with another preferred embodiment of the present invention a method for processing information received over a computer network, the processed information being processed by a method, which includes receiving information from at least one source of information over a computer network, parsing at least some of the information and employing at least some results of the parsing to provide a user sensible directory of the information.

Further in accordance with a preferred embodiment of the present invention the user sensible directory is an outline.

Still further in accordance with a preferred embodiment of the present invention the user sensible directory is a table of contents.

Additionally in accordance with a preferred embodiment of the present invention the user sensible directory is an index.

Furthermore in accordance with a preferred embodiment of the present invention the parsing step includes parsing Java script.

Moreover in accordance with a preferred embodiment of the present invention the parsing step includes parsing a mark-up language.

There is further provided in accordance with yet another preferred embodiment of the present invention a method for processing information received over a computer network, the processed information being processed by a method, which includes receiving information from at least one source of information over a computer network, parsing at least some of the information and employing at least some results of the parsing to automatically eliminate at least a preselected category of the information.

Further in accordance with a preferred embodiment of the present invention the preselected category of the information includes advertisements.

Still further in accordance with a preferred embodiment of the present invention the preselected category of the information includes references to other information.

Furthermore in accordance with a preferred embodiment of the present invention the method also includes employing at least some results of the parsing to provide a user sensible directory of the information.

Moreover in accordance with a preferred embodiment of the present invention the parsing step includes parsing Java script.

Further in accordance with a preferred embodiment of the present invention the parsing step includes parsing a mark-up language.

There is further provided in accordance with yet another preferred embodiment of the present invention, a method for processing information received over a computer network, the processed information being processed by a method, which includes receiving information from at least one source of information over a computer network, parsing at least some of the information and employing at least some results of the parsing to differentiate at least one general information portion thereof from at least one specific information portion thereof and to present the at least one general information portion separately from the at least one specific information portion.

Further in accordance with a preferred embodiment of the present invention the method the employing step presents the at least one general information portion before the at least one specific information portion.

Still further in accordance with a preferred embodiment of the present invention the method also includes employing at least some results of the parsing to provide a user sensible directory of the information.

Further in accordance with a preferred embodiment of the present invention the method also includes employing at least some results of the parsing to automatically eliminate at least a preselected category of the information.

Still further in accordance with a preferred embodiment of the present invention the parsing step includes parsing Java script.

Additionally in accordance with a preferred embodiment of the present invention the parsing step includes parsing a mark-up language.

There is provided in accordance with another preferred embodiment of the present invention a method for processing information provided to a user as he surfs the Internet according to a method, which includes enabling the user to surf the Internet using a web browser and to print information retrieved from the Internet, providing the user with a client application which communicates via the Internet with an external server, enabling the client application to inform the external server of data regarding information printed by the user and employing the external server to provide personal profile information regarding the user.

Further in accordance with a preferred embodiment of the present invention the method also includes the step of transmitting information to the user via the client application based on the personal profile information.

Furthermore in accordance with a preferred embodiment of the present invention the method also including employing the client application for: receiving information from at least one source of information over a computer network, parsing at least some of the information and employing at least some results of the parsing to provide a user sensible directory of the information.

Moreover in accordance with a preferred embodiment of the present invention the method also includes employing the client application for: receiving information from at least one source of information over a computer network, parsing at least some of the information and employing at least some results of the parsing to automatically eliminate at least a preselected category of the information.

Further in accordance with a preferred embodiment of the present invention the method also includes employing the client application for: receiving information from at least one source of information over a computer network, parsing at least some of the information and employing at least some results of the parsing to provide differentiate at least one general information portion thereof from at least one specific information portion thereof and to present the at least one general information portion separately from the at least one specific information portion.

Additionally in accordance with a preferred embodiment of the present invention the method includes receiving information from at least one source of information over a computer network, parsing at least some of the information and employing at least some results of the parsing to provide the information to a user in a changed presentation format.

Further in accordance with a preferred embodiment of the present invention the employing step presents at least one general information portion before at least one specific information portion.

Furthermore in accordance with a preferred embodiment of the present invention the method also includes employing at least some results of the parsing to provide a user sensible directory of the information.

Moreover in accordance with a preferred embodiment of the present invention the method also includes employing at least some results of the parsing to provide a user sensible directory of the information.

Further in accordance with a preferred embodiment of the present invention the method also includes employing at least some results of the parsing to automatically eliminate at least a preselected category of the information.

Still further in accordance with a preferred embodiment of the present invention the parsing step includes parsing Java script.

Furthermore in accordance with a preferred embodiment of the present invention the parsing step includes parsing a mark-up language.

BRIEF DESCRIPTION OF THE DRAWINGS AND APPENDICES

The present invention typically is understood and appreciated from the following detailed description, taken in conjunction with the drawings and appendices in which:

FIG. 2 is a screen shot illustrating a typical prior art webpage;

Figure 1:
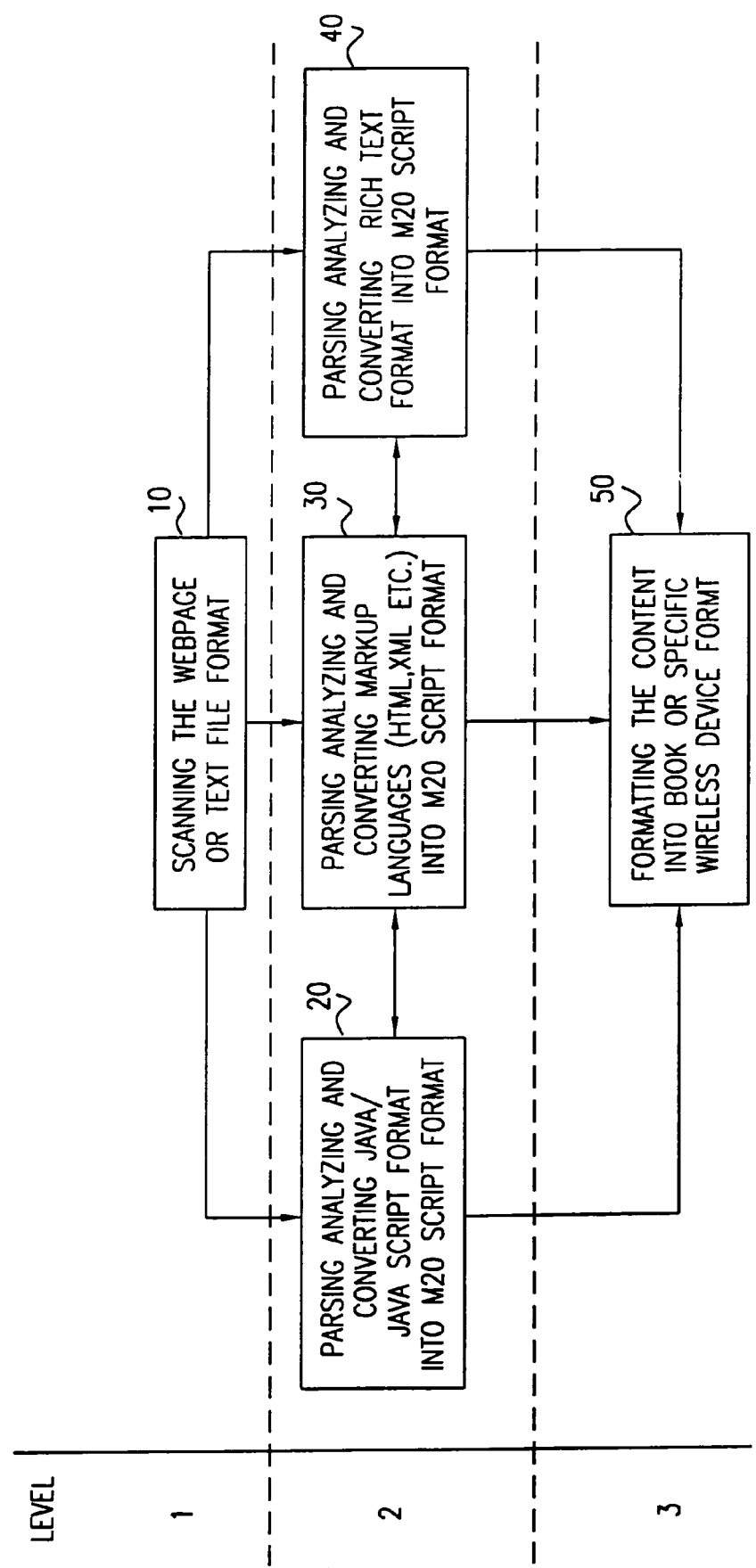
FIG. 1 is a simplified diagram of an information processing method employed in accordance with a preferred embodiment of the present invention.
Figure 5A:
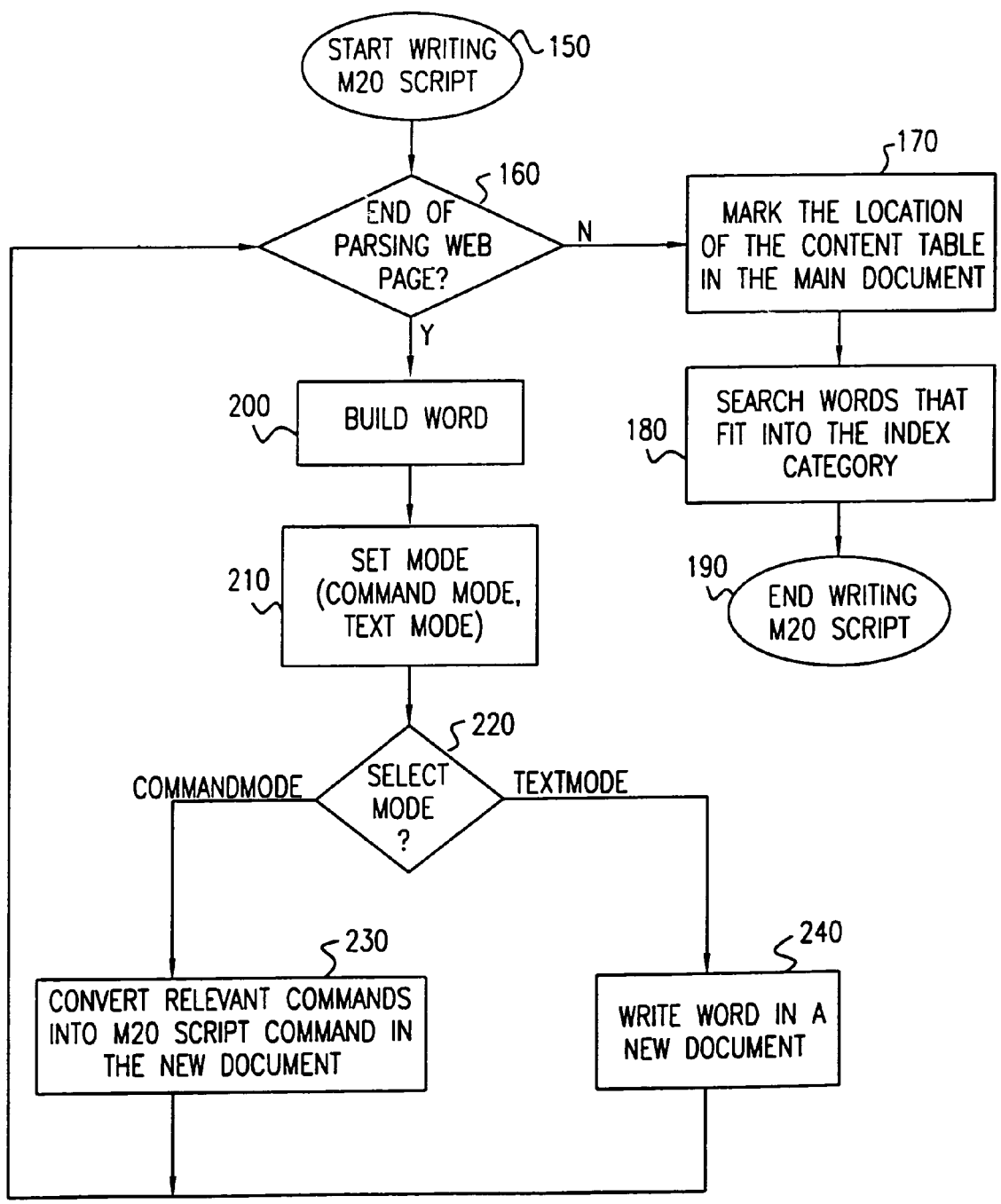
Figure 5B:
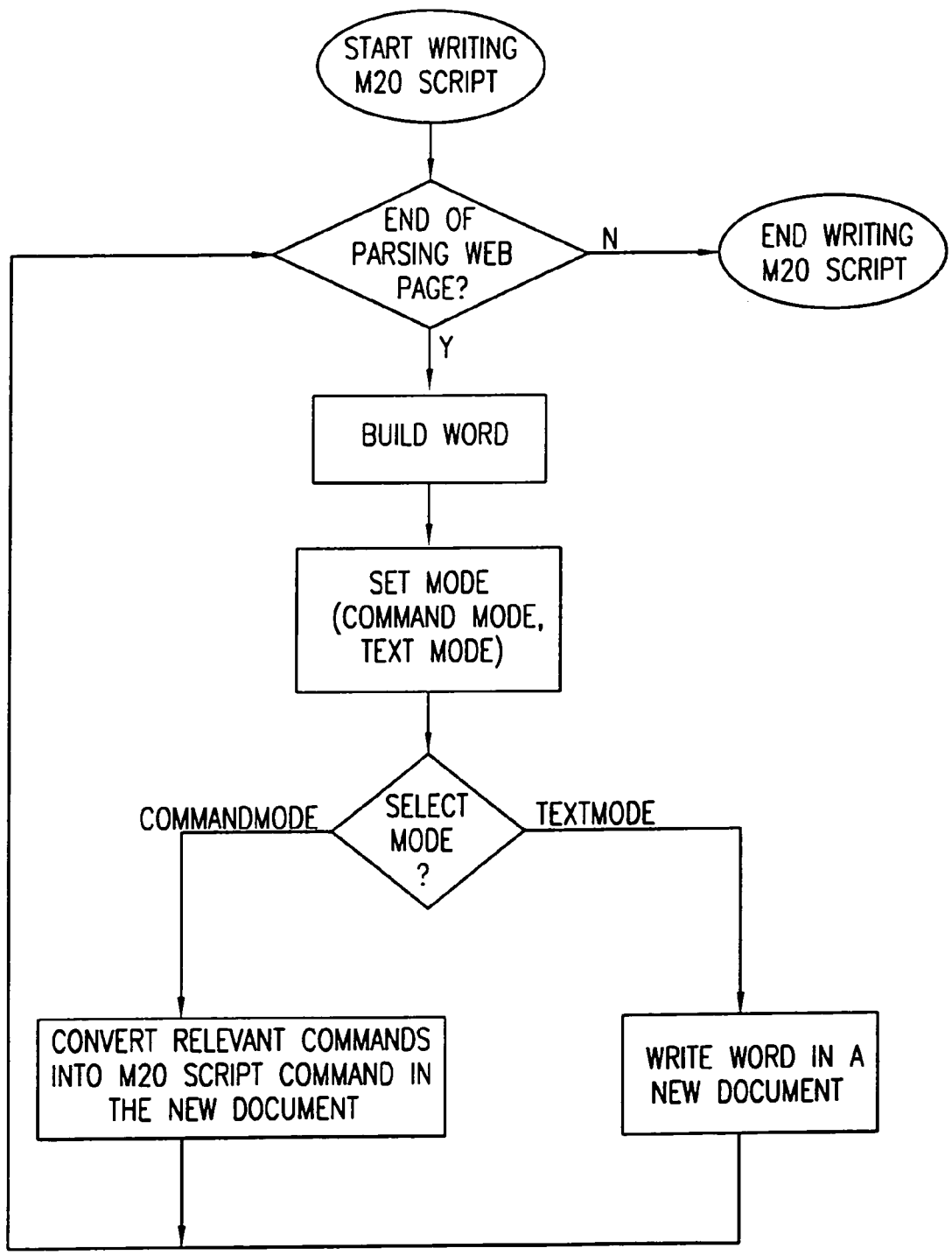
Figure 6:
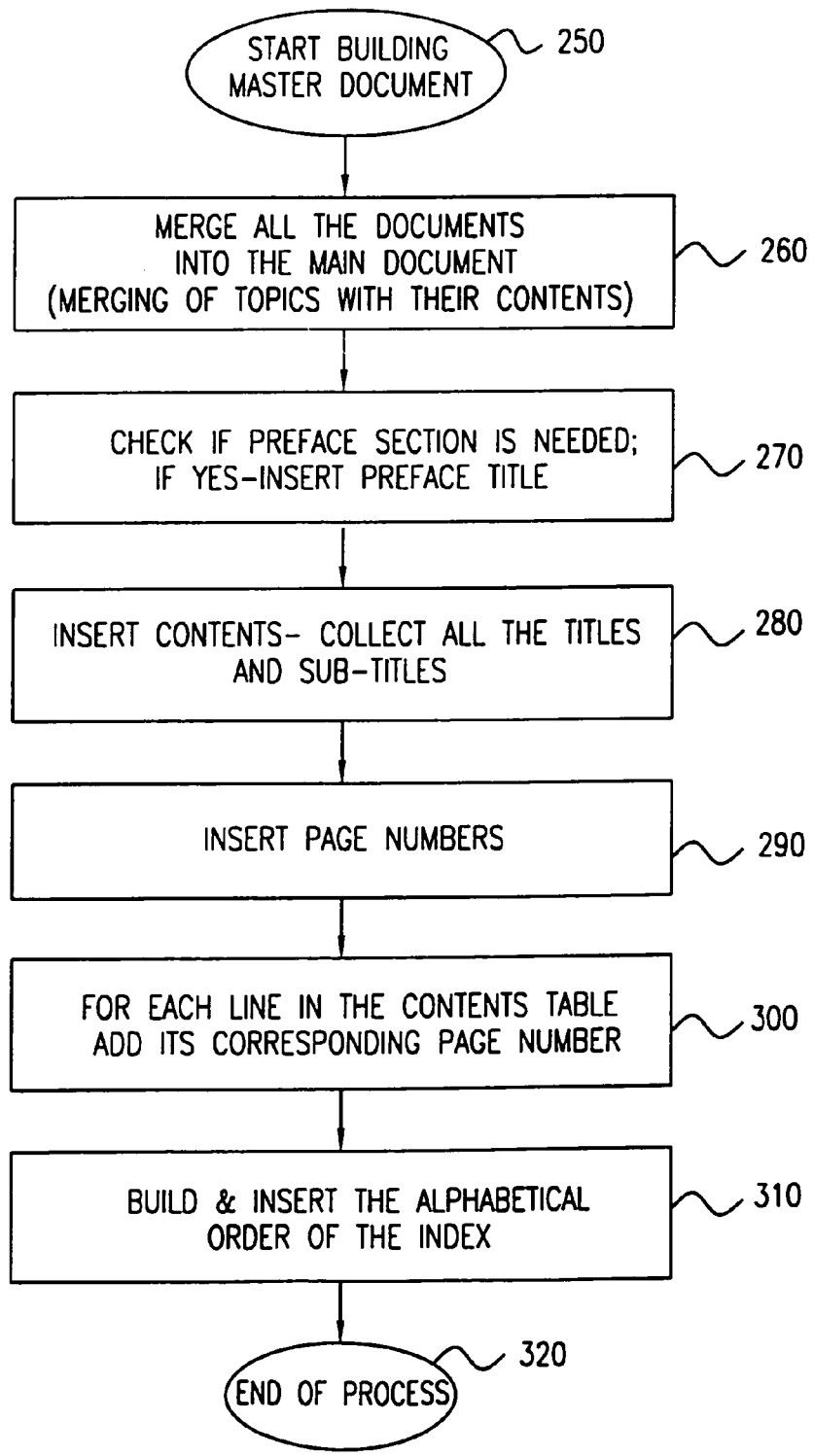
Figure 7:
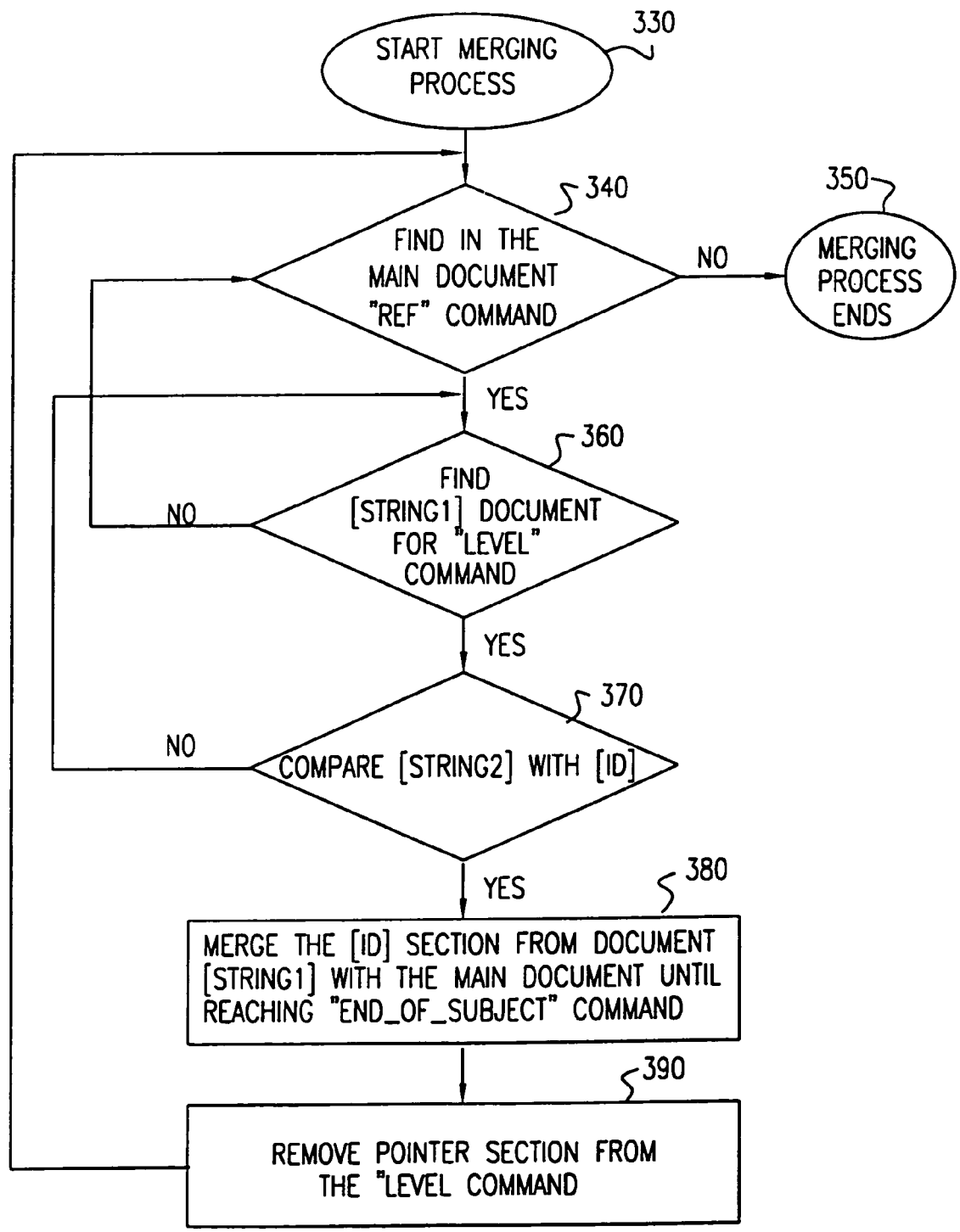
Figures 8A, 8B, 8C, 8D:
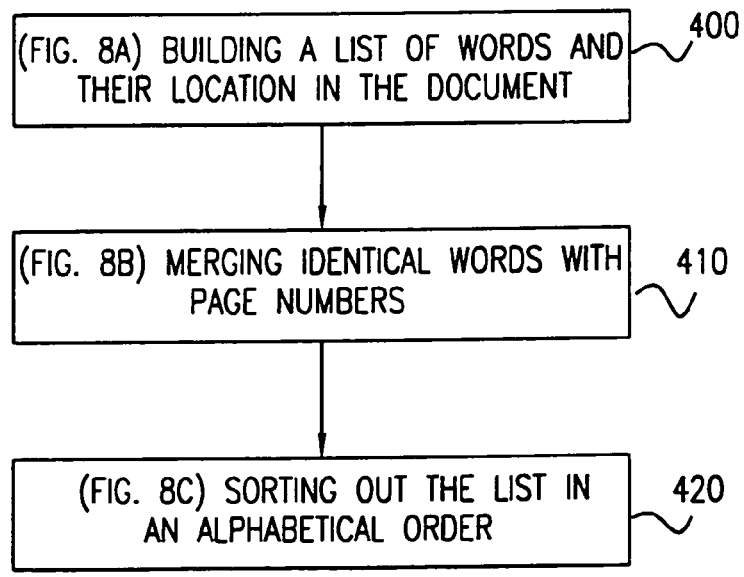
Figure 9A:
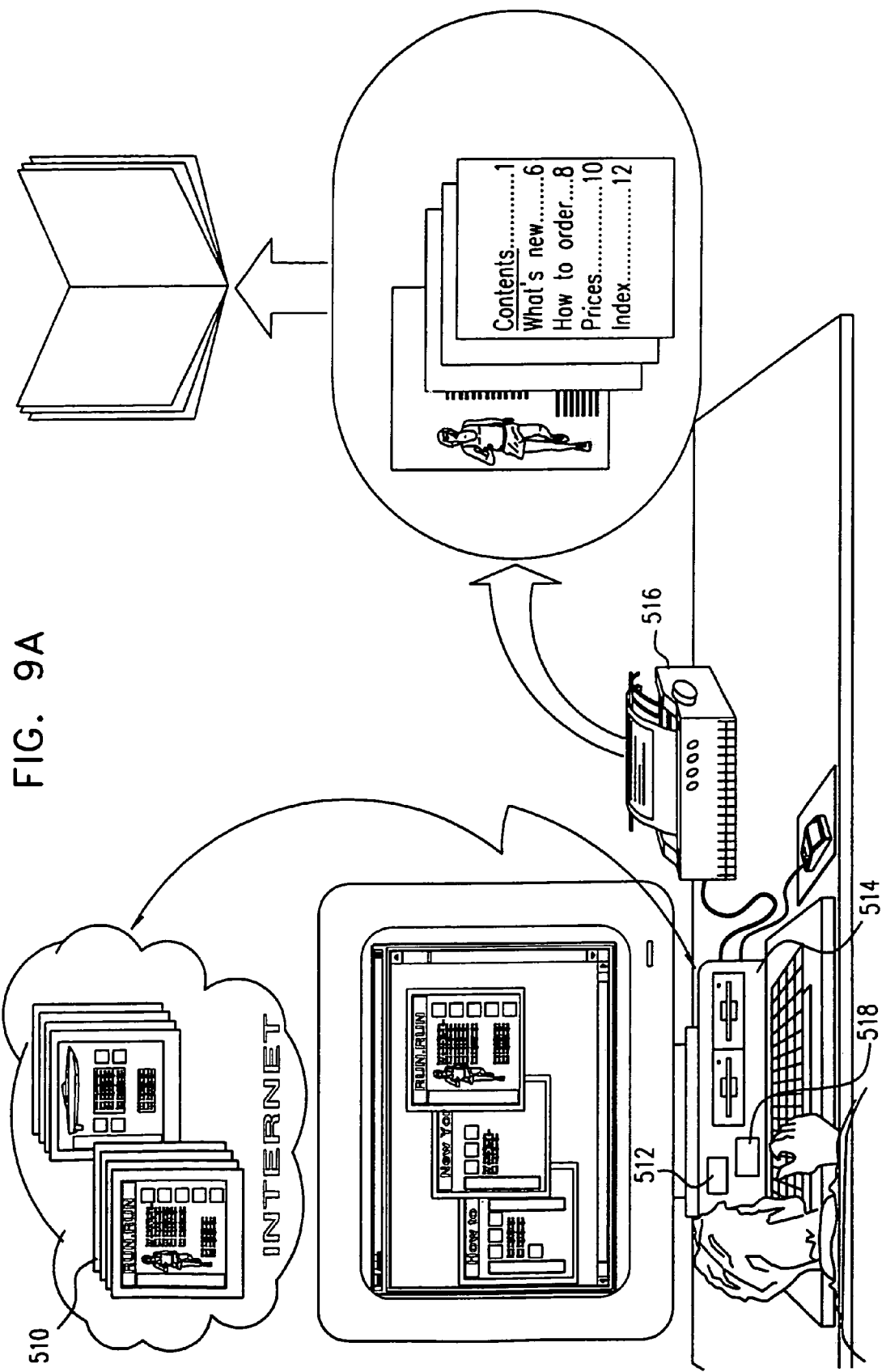
Figure 9B:
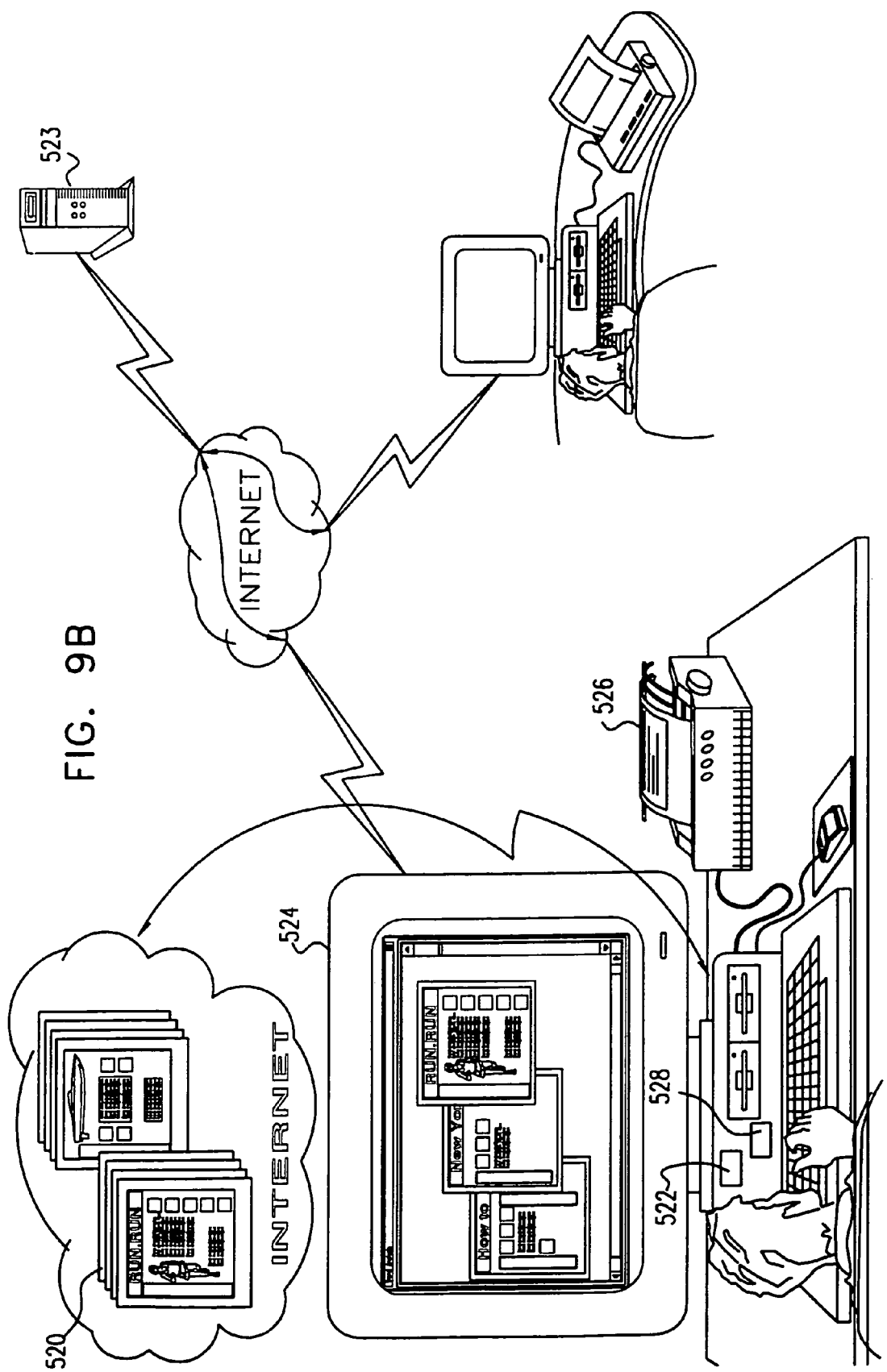
Figure 10:
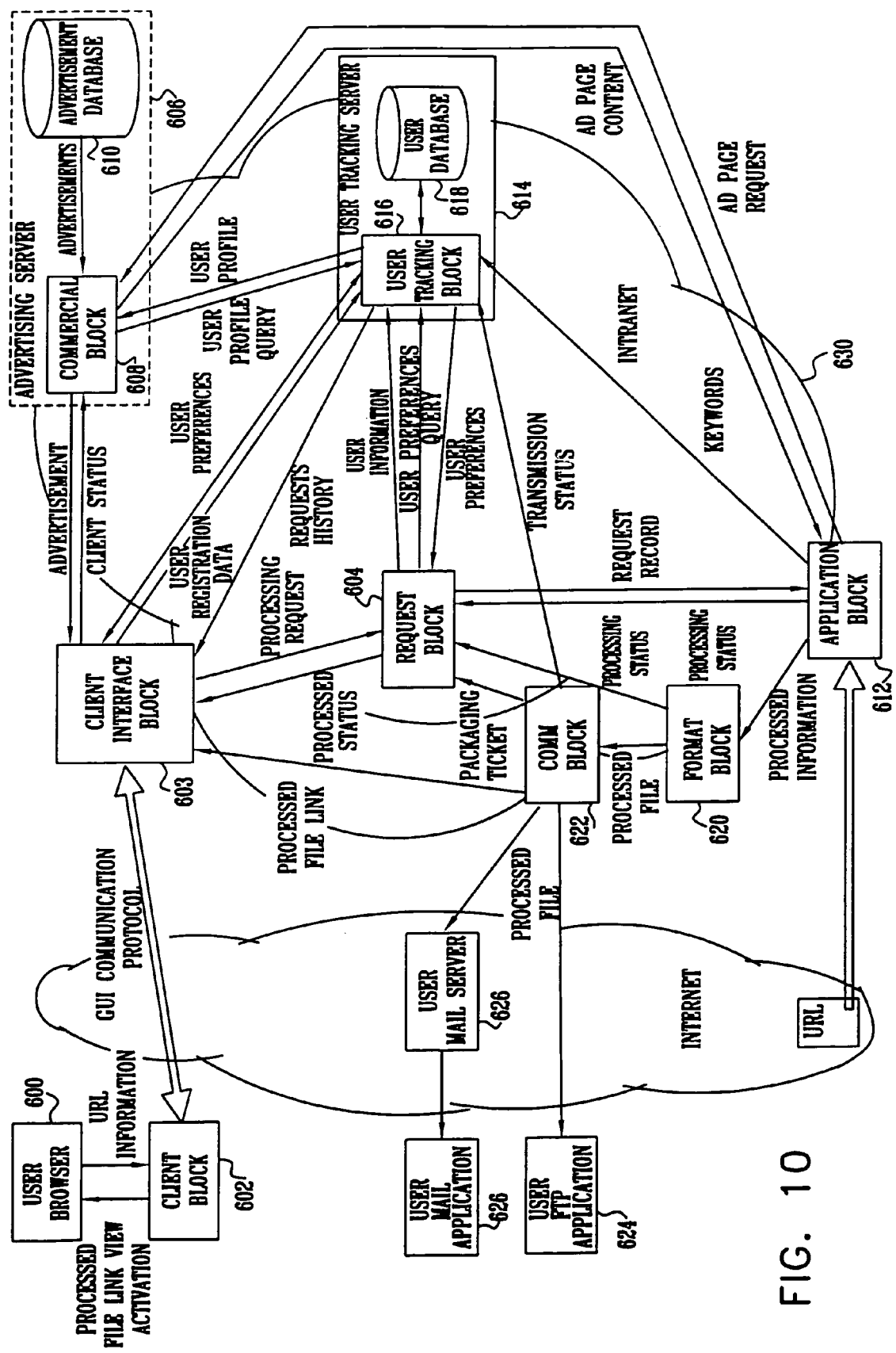
Figure 11:
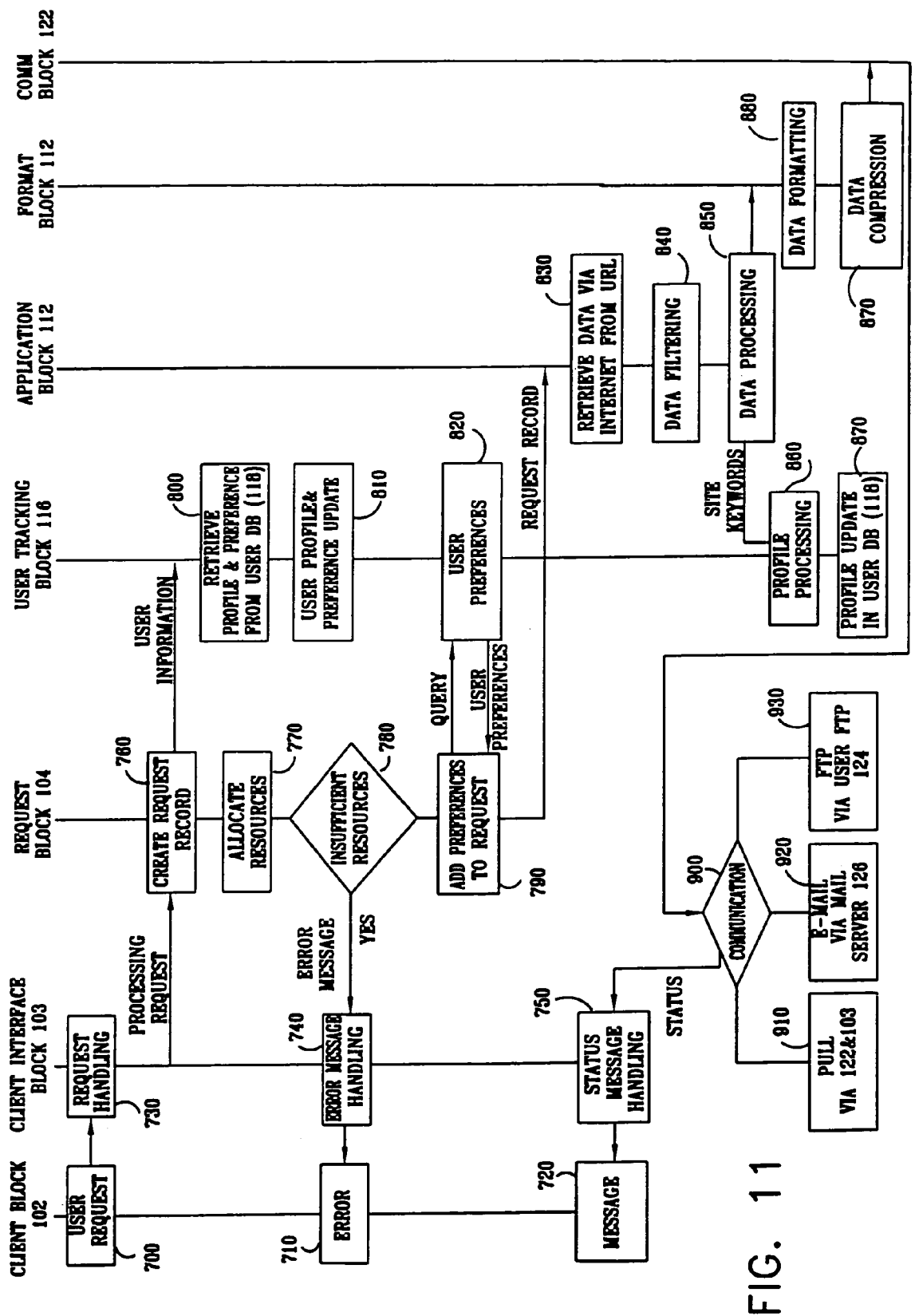
Figure 12:
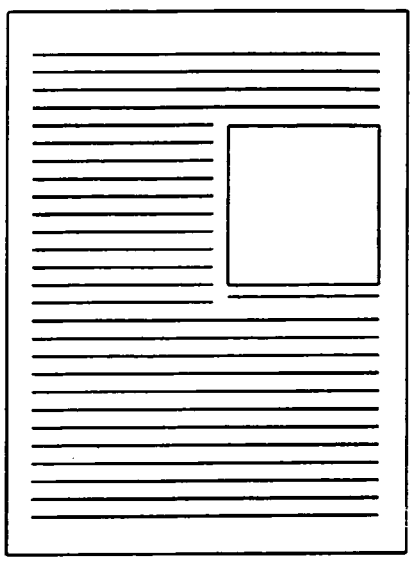
Figure 13:
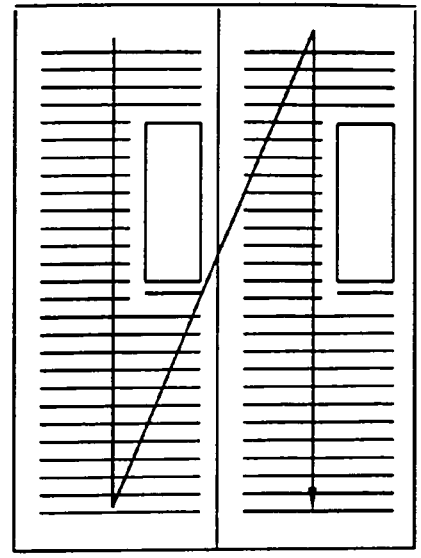
Figure 14:
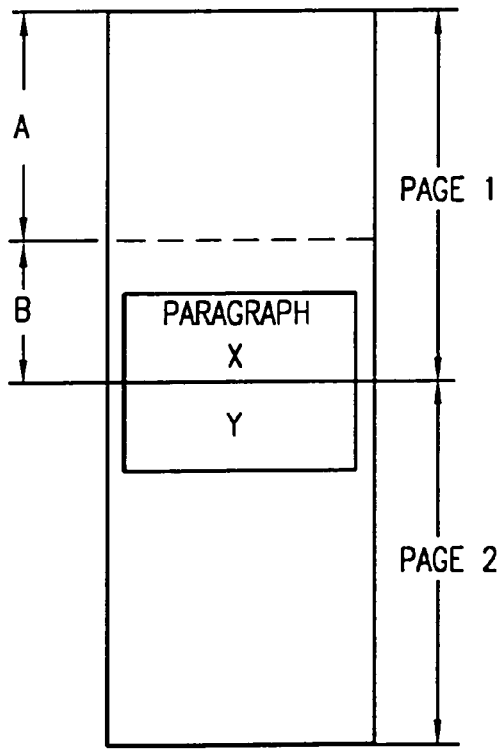
Figure 15:
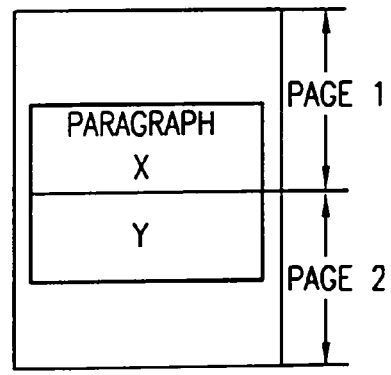
Figure 16:
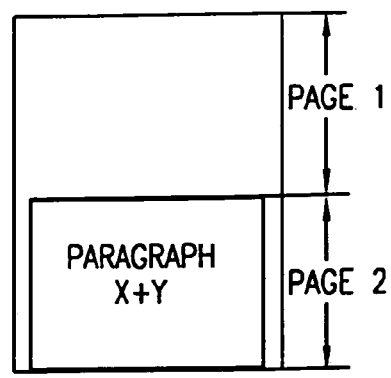
Figure 17:
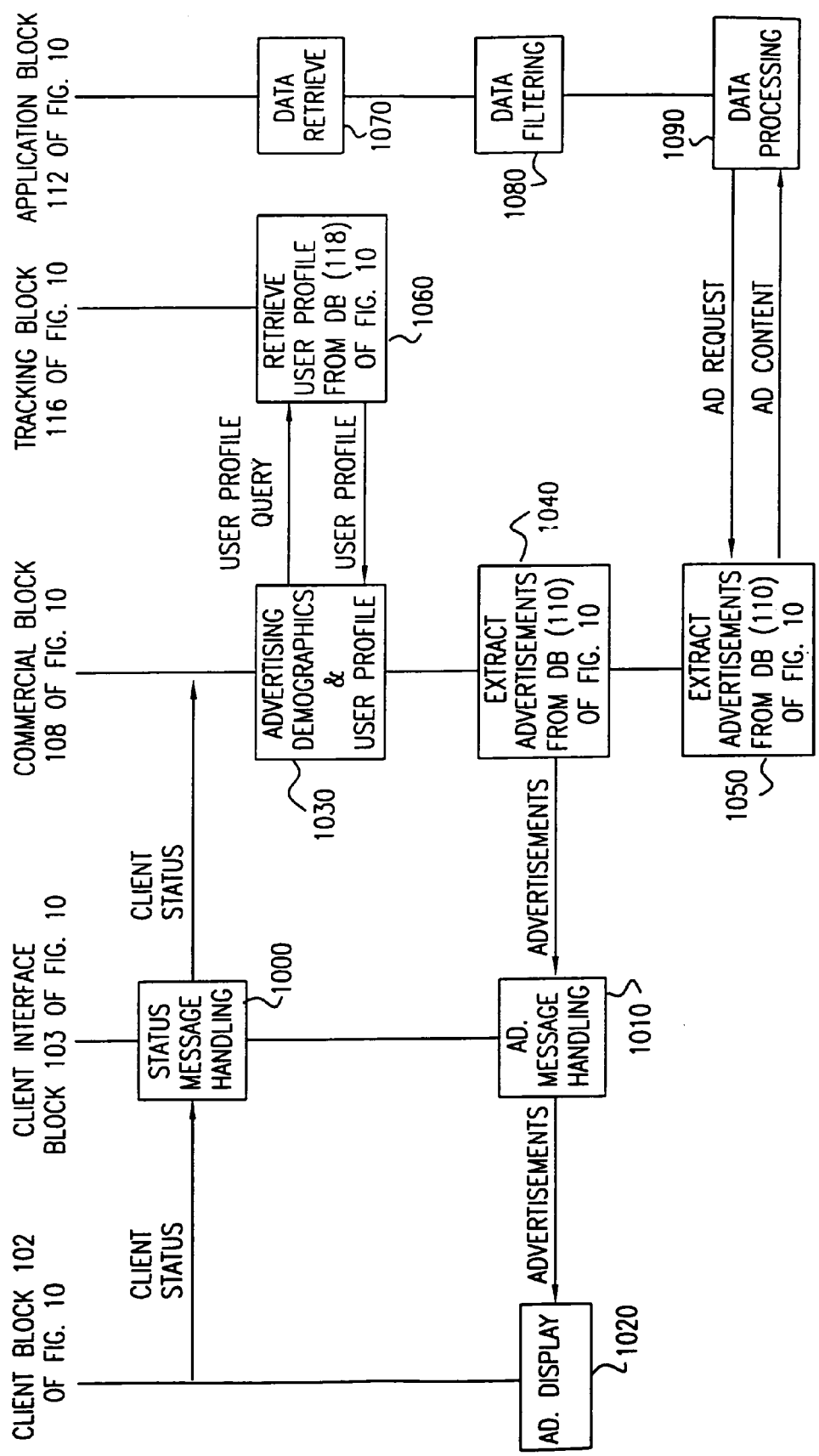
Figure 18B:
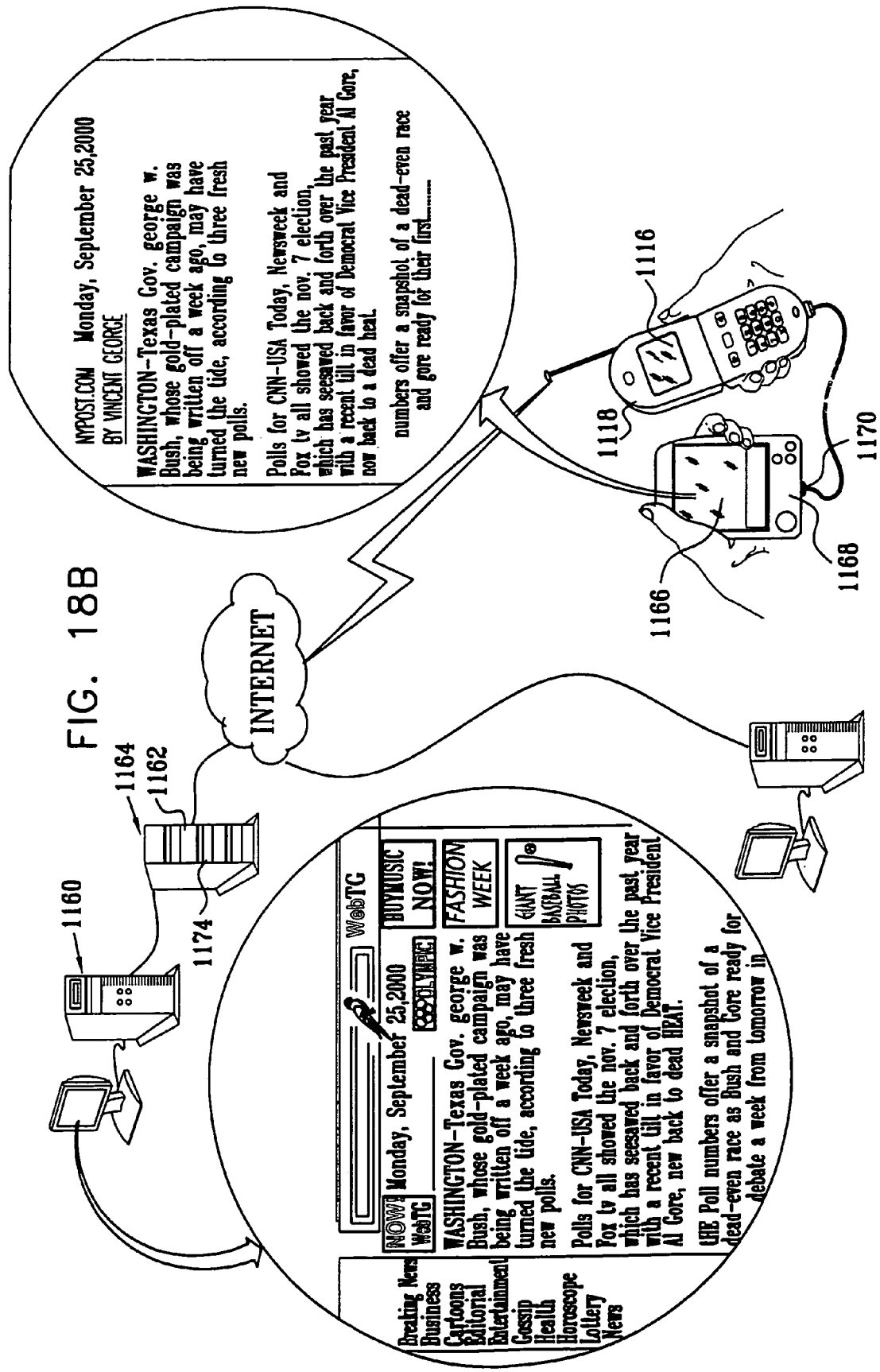
Figure 19:
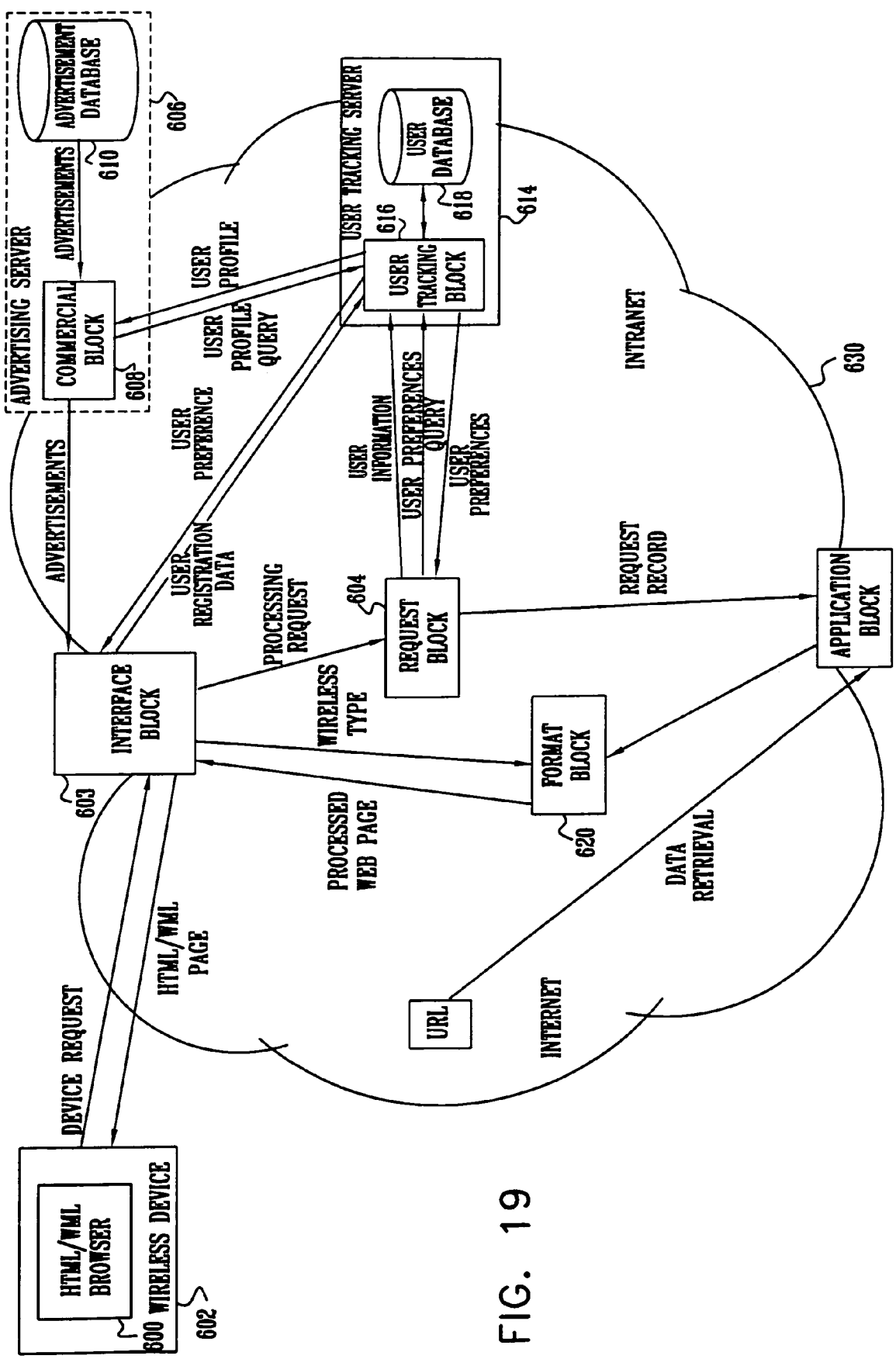
Figure 20:
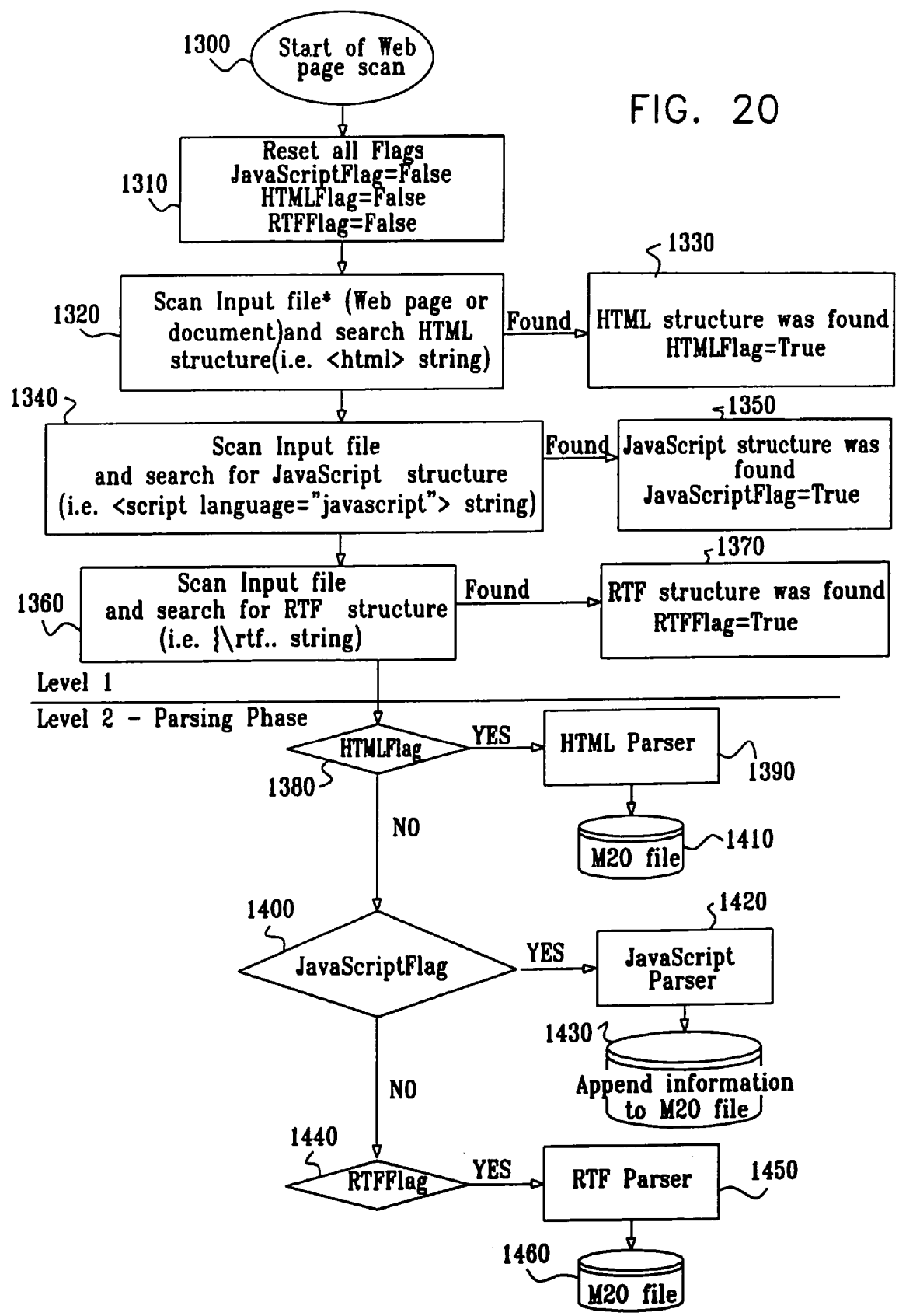
Figure 21:
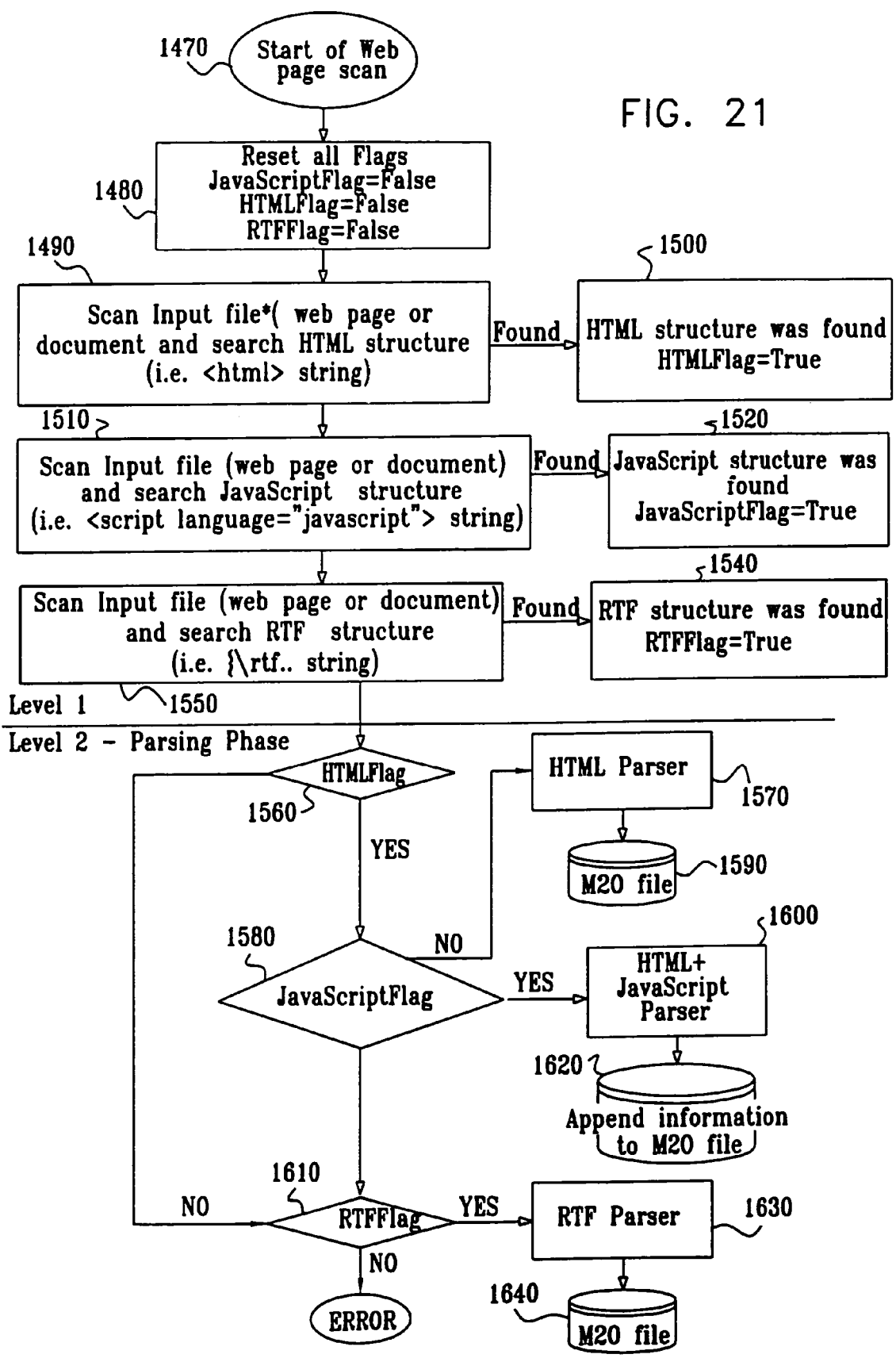
Figure 22:
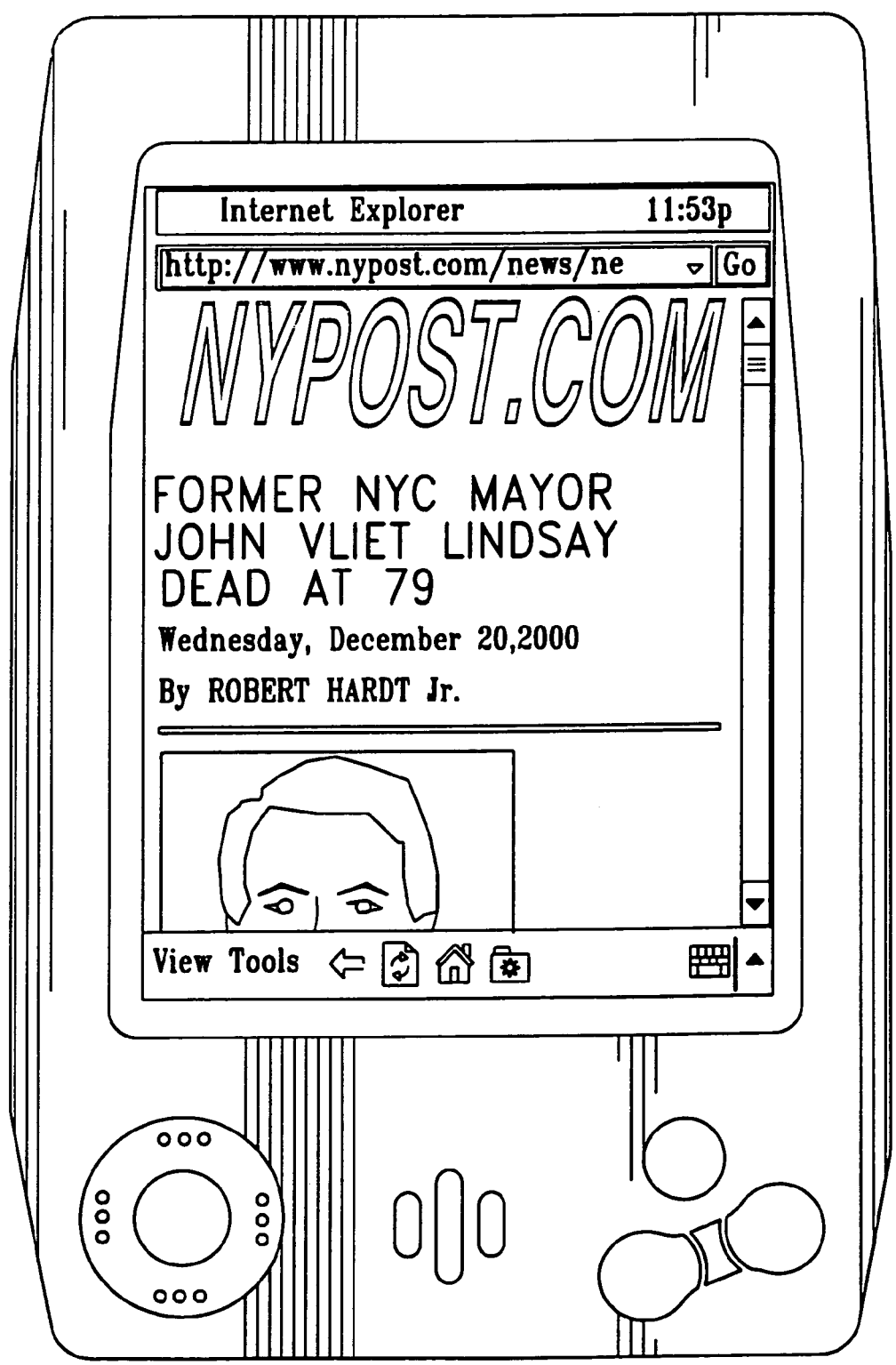
Figure 23:
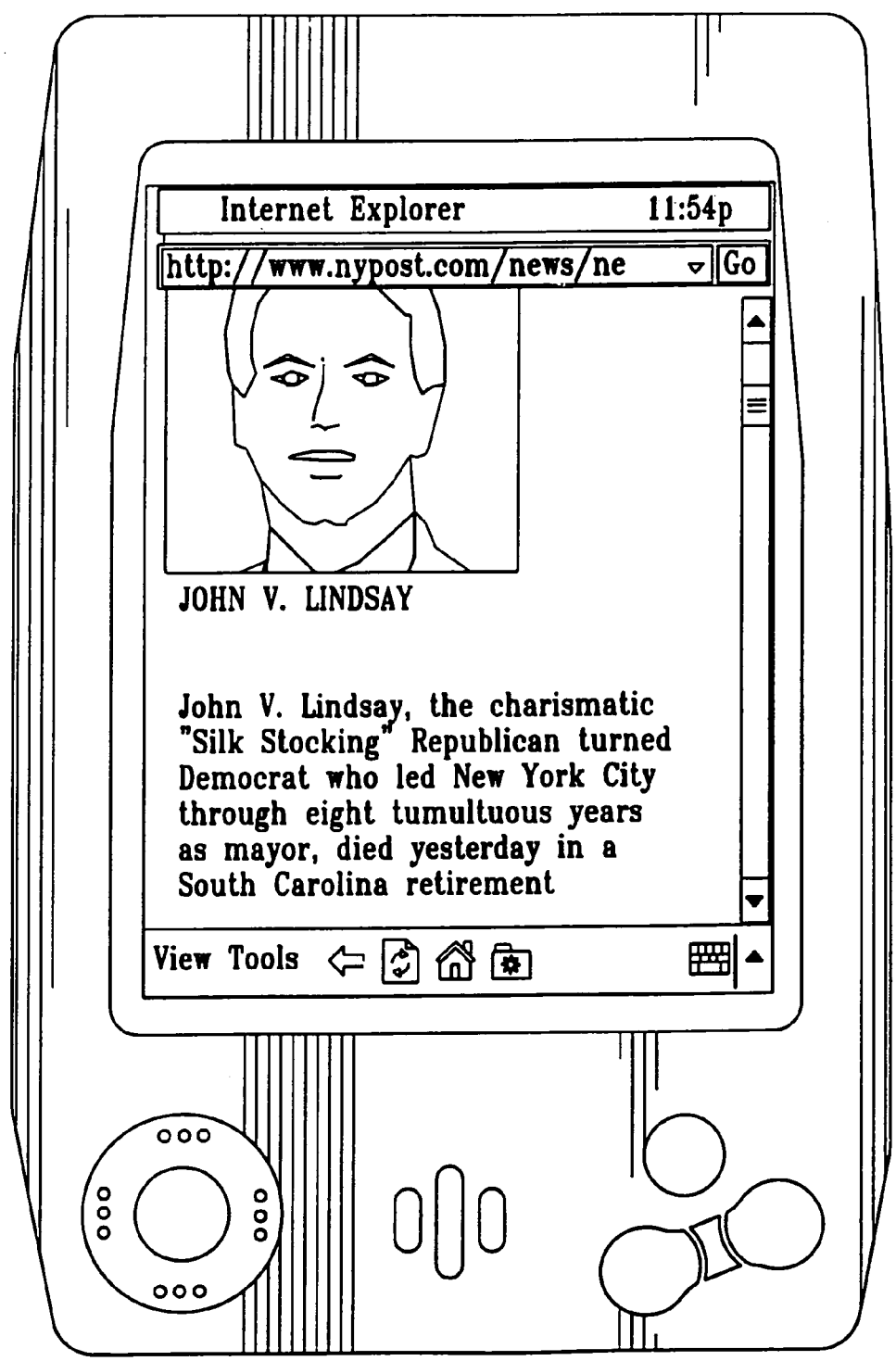
Figure 24:
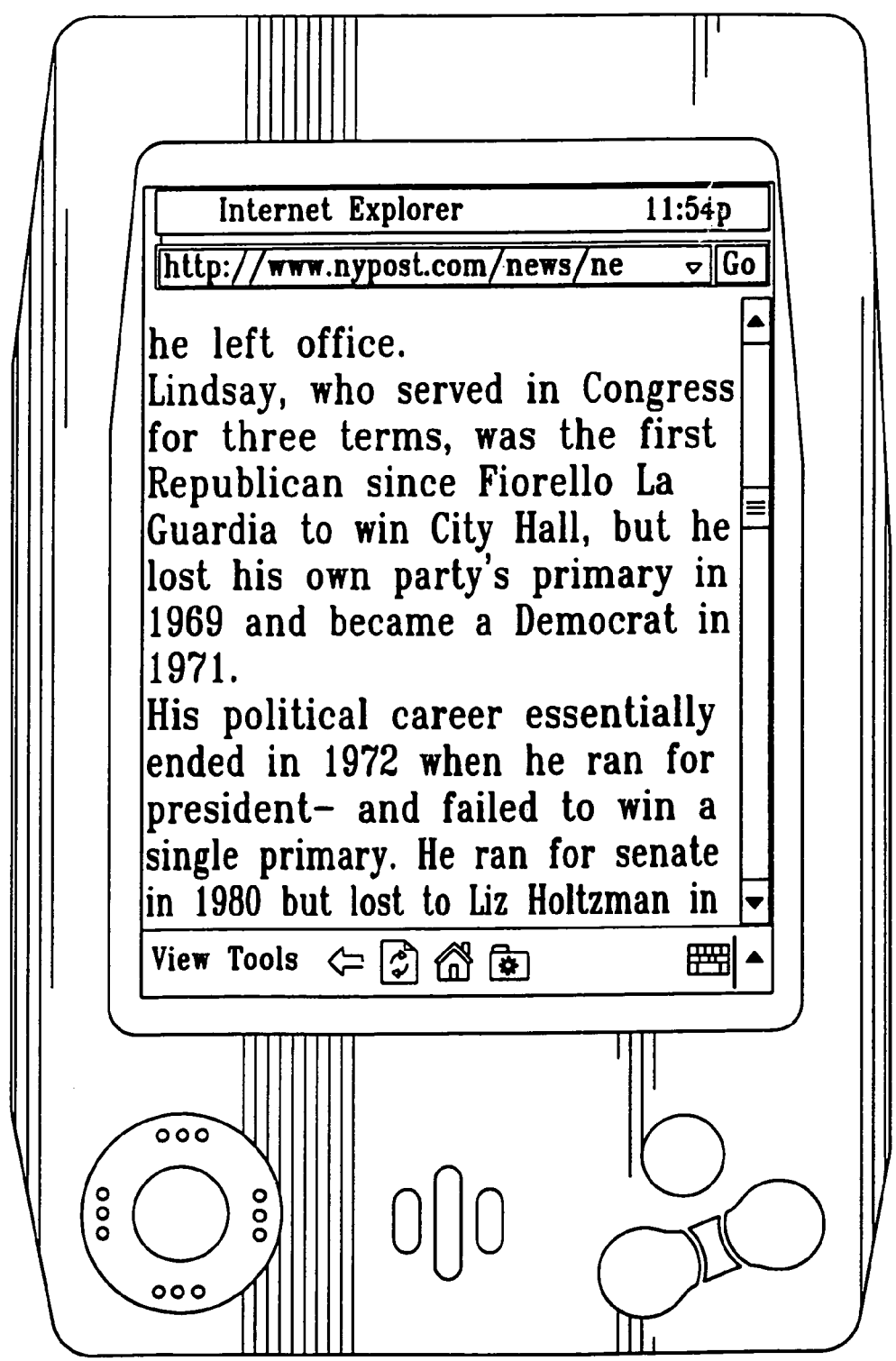
Figure 25:
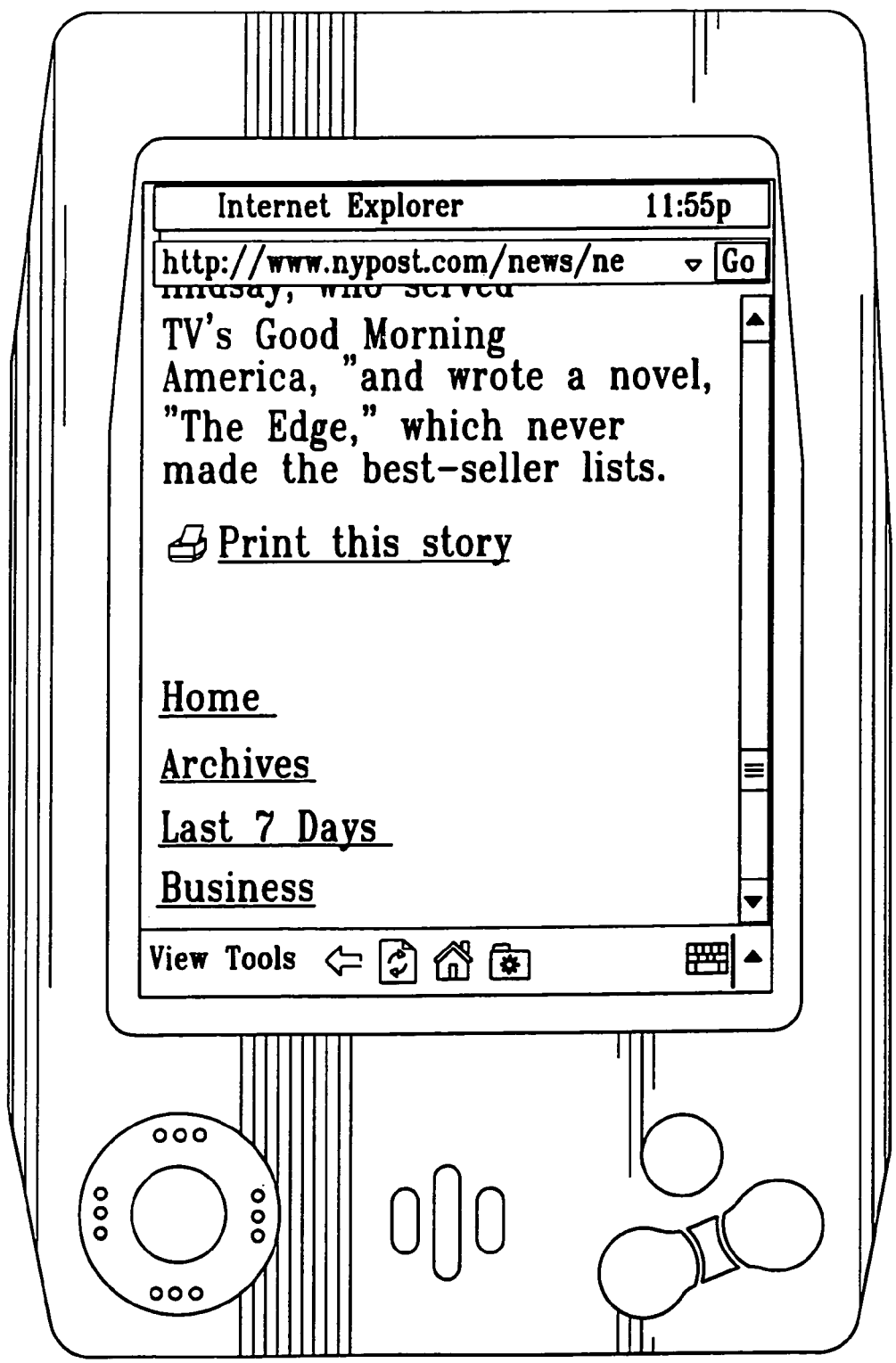
Figure 26:
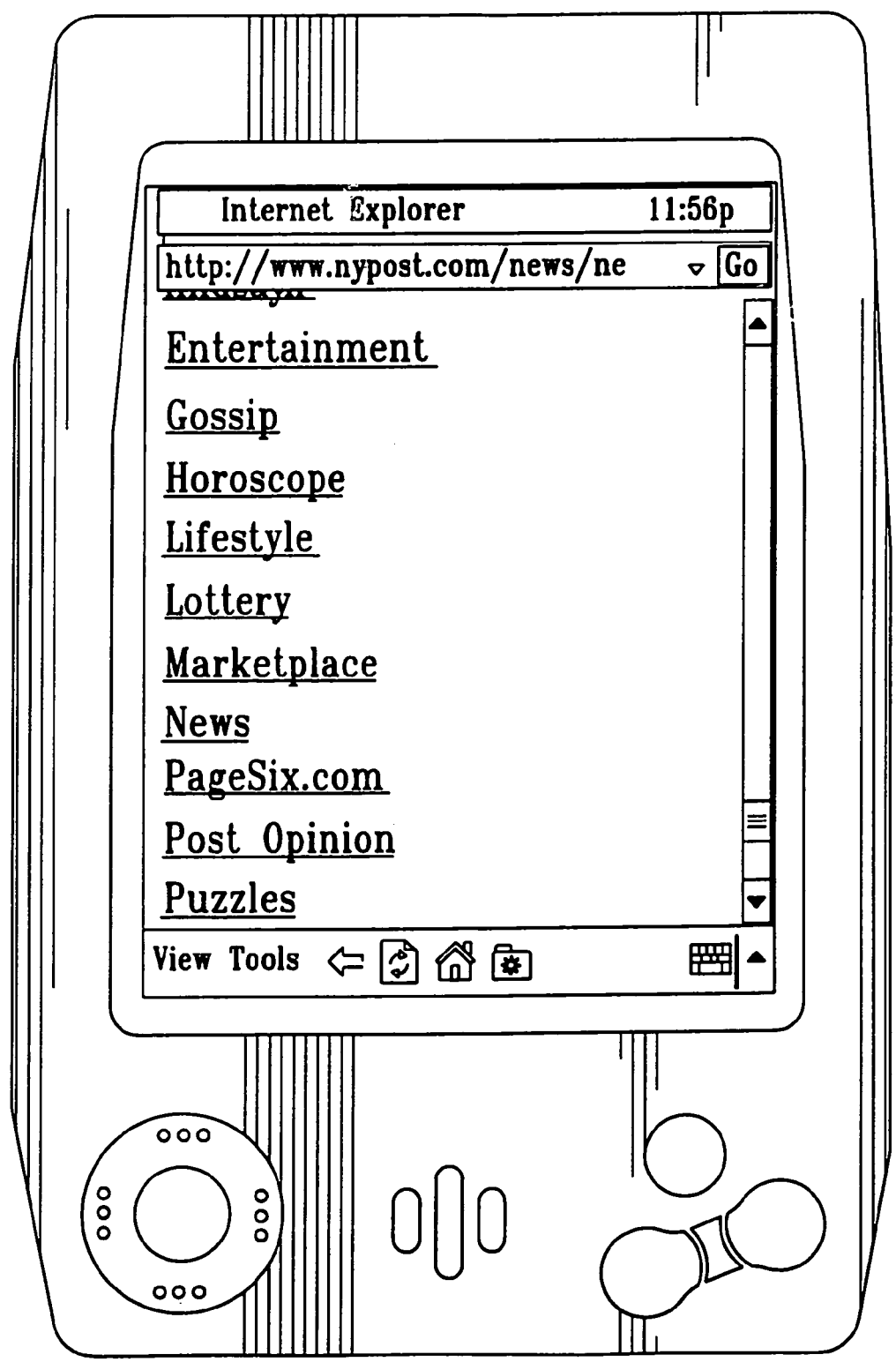
Figure 27:
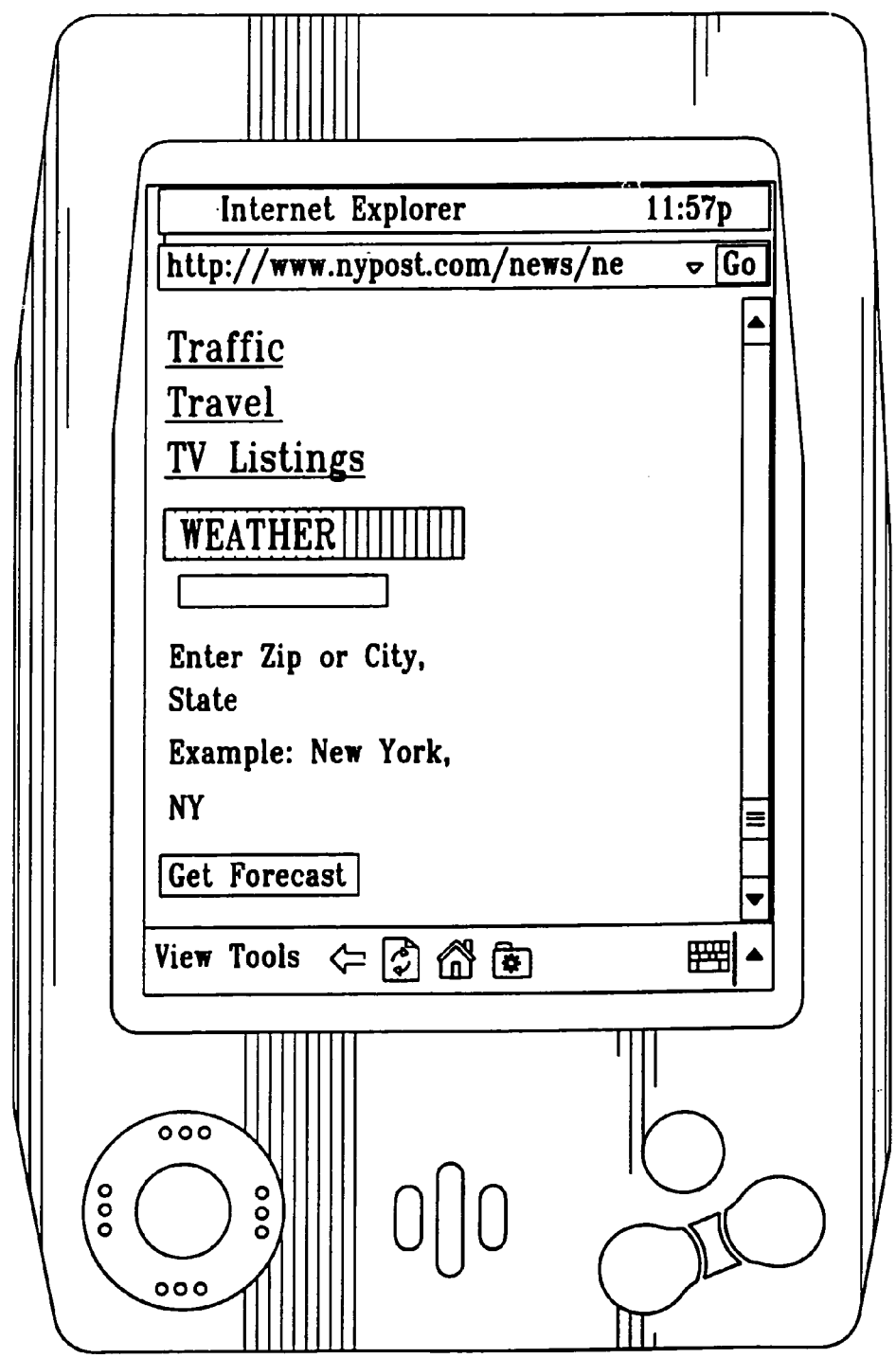
Figure 29:
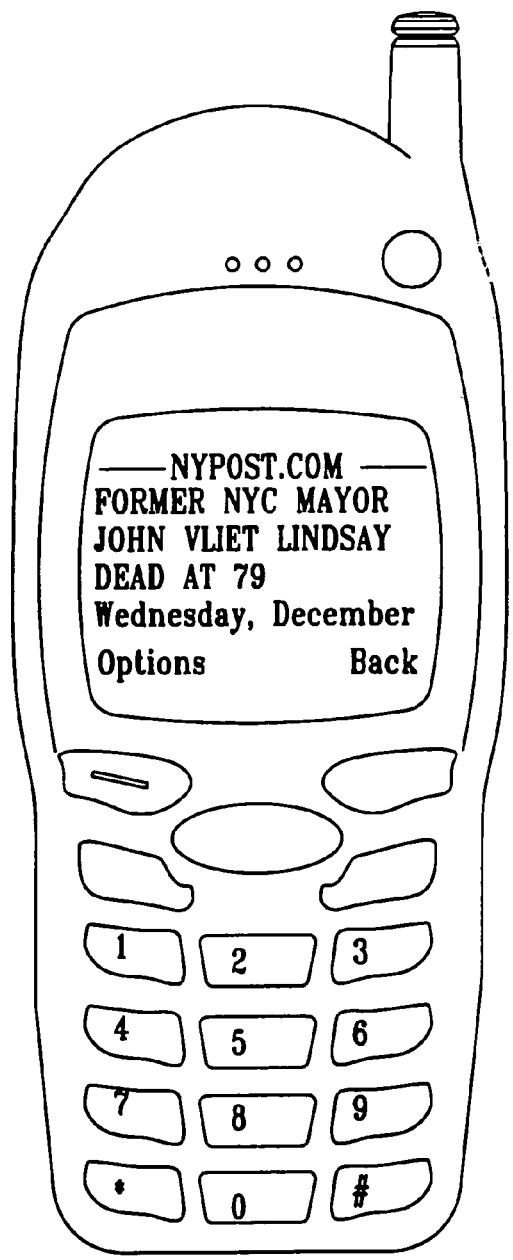
Figure 30:
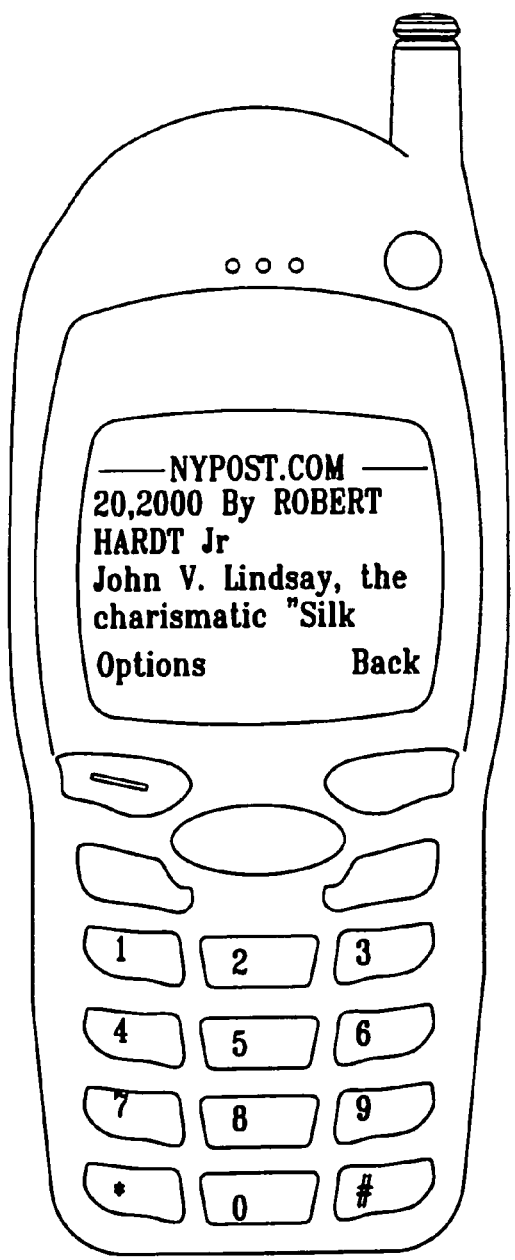
Figures 31C, 31D, 32:
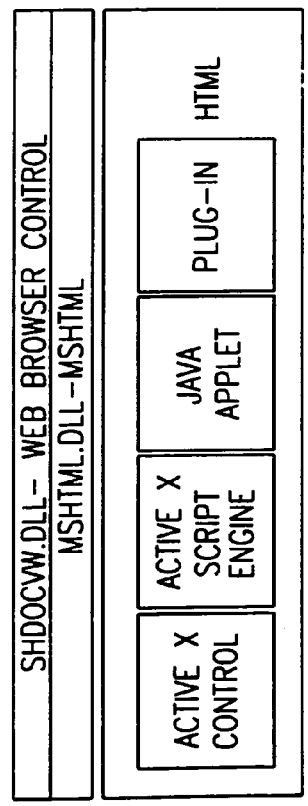
Figure 33:
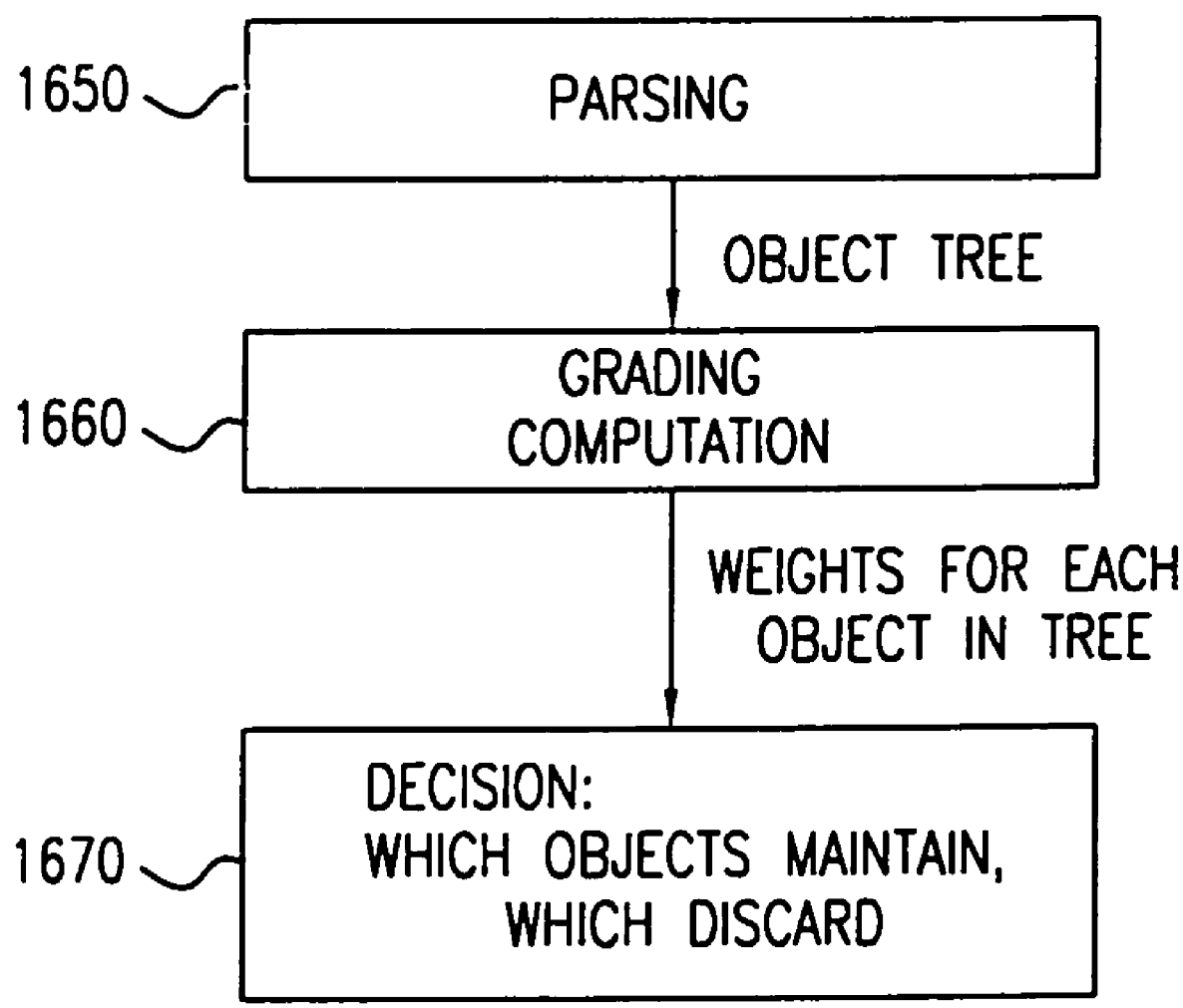
Figure 34:
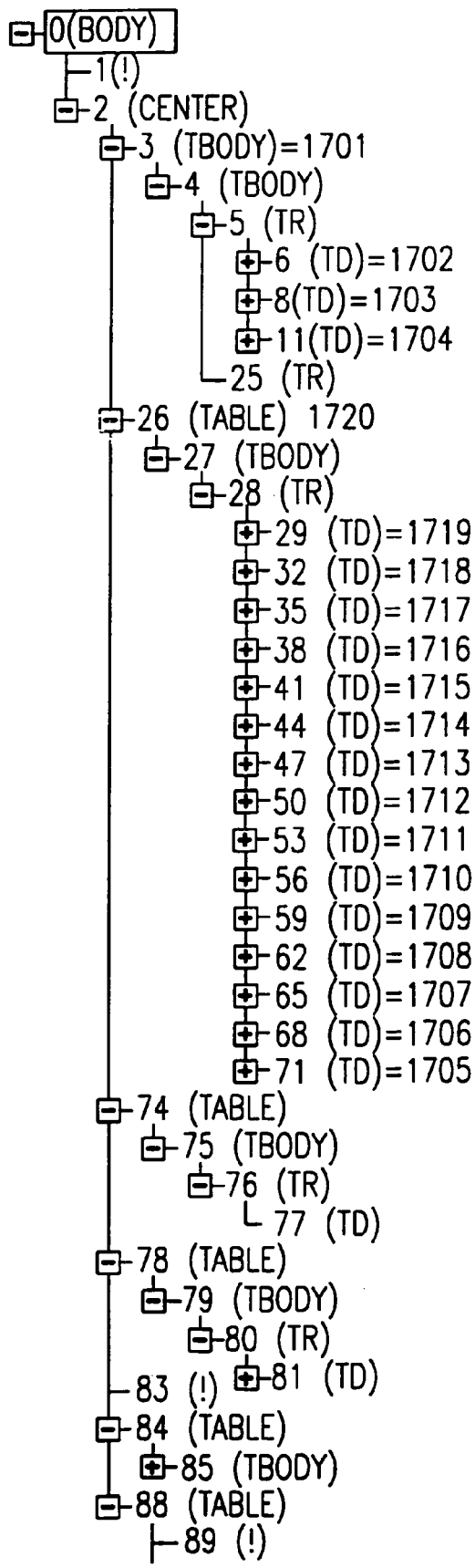

FIGS. 5A and 5B, taken together, form a simplified flowchart illustration of a preferred method for implementing the parsing step of any of the three M2O conversion functions of Level 2 in FIG. 1;

FIG. 6 is a simplified flowchart illustration of a preferred method for executing Level 3 of FIG. 1;

FIG. 7 is a simplified flowchart illustration of a preferred method for implementing the merge step of FIG. 6;

FIGS. 8A–8C are diagrams illustrating results of three stages of processing preferably performed in the index building step of FIG. 6;

FIG. 8D is a simplified flowchart illustration of a preferred method for performing the index building process of FIG. 6;

FIG. 9A is a simplified pictorial illustration of a system for processing information in accordance with one preferred embodiment of the invention;

FIG. 9B is a simplified pictorial illustration of a system for processing information in accordance with another preferred embodiment of the invention;

FIG. 10 is a simplified block diagram illustration of a preferred wired embodiment of the system of FIG. 9B;

FIG. 11 is a simplified, flow diagram illustrating operation of the system of FIG. 10 in response to a user request;

FIG. 12 is an illustration of a typical book style format;

FIG. 13 is an illustration of a typical pamphlet style format style;

FIG. 14 is an illustration useful in a discussion of page break considerations;

FIG. 15 is an illustration of a paragraph split between pages;

FIG. 16 is an illustration of a paragraph moves to a subsequent page;

FIG. 17 is a simplified flow diagram illustrating preferred operation of the system of FIG. 10 relating to advertising;

FIG. 18A is a simplified pictorial illustration of a system for processing information for display on wireless devices in accordance with one preferred embodiment of the invention;

FIG. 18B is a simplified pictorial illustration of a system for processing information for display on wireless devices in accordance with another preferred embodiment of the invention;

FIG. 18C is a simplified pictorial illustration of a system for processing information for display on wireless devices in accordance with yet another preferred embodiment of the invention;

FIG. 19 is a simplified block diagram illustration of a preferred wireless embodiment of the system of FIG. 9B;

FIG. 20 is a simplified flowchart illustration of a first preferred method for performing levels 1 and 2 of the method of FIG. 1;

FIG. 21 is a simplified flowchart illustration of a second preferred method for performing levels 1 and 2 of the method of FIG. 1;

FIGS. 22–27 are pictorial illustrations of webpage content displayed sequentially on a small screen after being processed by a preferred embodiment of the present invention;

FIG. 28 is a pictorial illustration of a webpage whose content is displayed in small screen format in FIGS. 22–27 and 29–30;

FIGS. 29–30 are pictorial illustrations of webpage content displayed sequentially on a very small screen without graphic capabilities after being processed by a preferred embodiment of the present invention;

FIGS. 31A–31D are tables representing a database structure useful in implementing a preferred embodiment of the present invention;

FIG. 32 illustrates preferred architecture of the parser shown in FIGS. 5A–5B;

FIG. 33 is a simplified flowchart illustration of a preferred method for performing the conversion functions of Level 2 of FIG. 1;

FIG. 34 is an example of an object tree generated by parsing the webpage of FIG. 28;

FIG. 35 depicts the tree of descendants of the elements of FIG. 34; and

FIG. 36 is a pictorial illustration of the components of the webpage of FIG. 28.

Attached herewith is the following appendix which aids in the understanding and appreciation of one preferred embodiment of the invention shown and described herein:

A CD-ROM Appendix is enclosed herewith from which can be derived files which, taken together, constitute the following two preferred embodiments of the present invention:

a. a first embodiment which displays webpage content on
        a small screen; and b. a second embodiment which displays webpage content in hard copy form e.g. in book form.

DETAILED DESCRIPTION OF A PREFERRED EMBODIMENT

The following is a generalized description of the methodology and functionality of the present invention:

Definitions and Acronyms

| | |
|---|---|
| M2O | New Markup to Objects script language/method suitable for implementing a preferred embodiment of the present invention |
| HTML | Hypertext Markup Language |
| Markup | A sequence of characters or other symbols inserted at certain places in a text or word processing file to indicate how the file should look when it is printed or displayed or to describe the document's logical structure |
| JavaScript | A scripting language developed by Netscape to enable Web authors to design interactive sites |
| XML | Short for Extensible Markup Language, a specification developed by the W3C. XML is a pared-down version of SGML, designed especially for Web documents |
| Object | The atomic part of a region |
| Base Object | The object which is the biggest or has the most number of words in it. |
| NYPOST | New York Post Online Edition |
| PDF | Portable Document Format, a file format developed by Adobe Systems |
| DOC | Extension identifying Microsoft Word documents |
| RTF | Rich Text Format —A standard formalized by Microsoft Corporation for specifying formatting of documents. RTF files are actually ASCII files with special commands to indicate formatting information, such as fonts and margins. |

Core Process Structure

The core process can be divided into three levels (see FIG. 1).

The First level: Scanning the Webpage/Text File Format

The application searches the Web source page or an input text file for Markup languages, Java, Java Script or Rich Text Format properties and determines what kind of process is needed in order to transform its information into objects.

The application passes the page content to one of the three following functions—each dealing with the extraction of the page content in a different way:

Markup languages—parses and analyzes the Markup languages syntax and translates the relevant properties into M2O script language.

Java/Java Script language—parses and analyzes the meaning of the commands and translates them into M2O script language.

Rich Text Format—parses and analyzes the text by a human convention for text code; that is, taking common knowledge of text format (e.g. Subject of section is in a different format, like bigger font size, etc.) and translating it into M2O script language.

There can be a situation in which there is a webpage that includes both Java and HTML script languages or any other combination of the above functions. In this kind of situation, after the end of the first function conversion and process, the application passes the document to the relevant function for the continuation of the process of conversion.

The Second level: Parsing, Analyzing and Converting (into M2O Script Language) the Content In this level the application removes irrelevant information (images and data i.e. advertising banners, links to unrelated issues) from the webpage, and reorganizes the information into objects with categories in a file represent by the M2O script language.

The process of determining which information should be included in the processed page is vary complicated and can be achieved first by analyzing the content after it was converted into objects.

The ability to determine what information is relevant and what is not comes from the basic principle by which webpages are organized—regions. Before insertion of content into the webpage, the webpage designer organizes the page into regions: regions for the article, for the navigation bar, for the advertising, etc. The reason of doing so is simple: minimal maintenance in the life cycle of the webpage by inserting only the updated information into the relevant region. Tools which content providers are using, give the writers a form with files to input information (i.e. headline, article body, pictures, etc.). After the writer finishes inserting the information into the form, the tool inserts the information into a pre-defined webpage template, each data field to its pre-configured location. If we are dealing with a content provider from the news sector, the changes are made on a daily basis, which emphasizes the need for such structure.

M2O Script language

M2O script is a new script language built especially for the current process. M2O script has special commands suitable for formatting a document/webpage in a book style format/webpage for devices with screen size and browser limitations. The script language is called M20, which stands for Markup to Objects.

Each M2O script command typically has the body of the following syntax:

M2O@[comma][Command][comma][optional command][comma][String][New line character ('\n')]

The sequence of "###M2O@" is selected for not having a "human meaning", so that it is identified as the start of a program instruction and treats subsequent information as a property.

Typical commands may include those specified in Table 1 below:

TABLE 1

| | |
|---|---|
| ###M2O@ title [string] | Title command - the string field in the title command represents the book name. |
| ###M2O@ ref [string1#string2] [subject name] | Reference command - string1 represents the name of the Webpage containing the information and string2 represents the pointer in that page containing the subject section. The subject name represents the title name for the specific subject |
| ###M2O@ end_of_subject | End of a Subject command - when the application finds the end of a subject command, it stops the merging process (described in the third level: Building a master document, FIG. 1) |

TABLE 1-continued

| Command | Description |
|---|---|
| ###M2O@ level [number] pointer [ID] [subject name] | Level command - sets the category of the title by the following numbers:<br>1 = New Chapter.<br>2 = New Section Title.<br>3 = New Sub-Title.<br>4 . . . 10 = New Sub-Sub Titles.<br>The pointer instruction represents the location on the page by the ID for comparison with the ref instruction string2 value. The subject name represents the name of the Chapter/Section Title/Sub Title/Sub-Sub Titles. |
| ###M2O@ index [word] | Index command - builds the alphabetical order Index at the end of the book. The application searches the entire document for some properties that can be identified as a word that user wants to see in the Index list. The properties may include some or all of the following: word in commas, word in brackets, word in italics, word in bold and word in capital letters. The word field represents the word that is found during the scanning process. |
| ###M2O@ contents | Contents command - sets the location of the Contents table. |
| ###M2O@ page [page_number] | Page command - sets the page number number |
| ###M2O@ new_page | Page command - sets a new page. |
| ###M2O@ align [type] [text] | Align command - aligns the following text at the orientation pointed to by the type field of the line.<br>Type field can be:<br>left<br>right<br>center |
| ###M2O@ bullet [level] [text] | Bullet command - inserts bullet before the beginning of the text. The class of the bullet is selected by the level value. |
| ###M2O@ bold [text] | Bold command - converts the Following text into bold. |
| ###M2O@ italic [text] | Italic command - converts subsequent text into Italics. |
| ###M2O@ underline [text] | Underline command - converts subsequent text into Underlined. |
| ###M2O@ font [type] [text] | Font command - selects for subsequent text the kind of font pointed to in the type field. |
| ###M2O@ image [file name] [x, y] | Image command - inserts image file into the document. The image is added after the current position of the text or by the given location of the optional fields [x, y]. |
| ###M2O@ size [object size] | Object size - the object size is a value equal to Width * Height of the object. |
| ###M2O@ base_object | The object, which is the biggest in the webpage region or has the most number of words in it. |
| ###M2O@ cardinal | The main subject of the given webpage. |
| ###M2O@ link_cluster | Object or a set of objects that contain a list of links. |
| ###M2O@ navigation_bar | Marks the object that has a list of links, which gives the user the ability to navigate to all the sections of the web site. |

Insertion of M2O script—FIGS. 5A–5B describe the Insertion of the M2O script into the processed file.

The insertion of the M2O script begins with scanning the entire webpage and parsing the contents into words related to the webpage commands and words related to the user-relevant information. Actually, it is a process of taking the additional information off the text itself. Some of the commands that are found may be relevant for formatting a document/webpage in a book-style format/webpage for devices with screen size and browser limitations. Some may be irrelevant (e.g. remarks, search engine keywords, etc.). The relevant commands that are found are translated into M2O script language.

Implementing the Process as a Book Style Document

The process of FIGS. 5A–5B is typically performed for each webpage. After finishing the current process, the merging of all the documents (former webpages) into one master document is executed in the third level. After scanning and converting all the relevant webpages and before the continuation to the next level, some additional processing is performed for formation of a document version. First, marking the location of the Contents is achieved by searching only the main document (the main document can be selected by the user) for the location of the first "ref" command and inserting the "contents" command before it. Second, the application searches all the documents for words that fit into the Index category, and when finding such words, the application inserts an "index" command. From that point on, the webpages are called "documents" since they have no longer have properties of a webpage.

Implementing the Process as a Mobile Server

The process of FIGS. 5A–5B is done once for each webpage requested by the user. After scanning and converting the webpage into M2O script language, the application jumps to the next level and no additional processing is performed.

In the M2O script language there are some commands, which are not a straightforward conversion from Markup languages/Java/Java Script/Rich Text Format commands (i.e. transcoding), but are a result of analyzing the given objects after parsing. This clarified in the following descriptions:

Converting the Webpage into Objects

Figure 2:
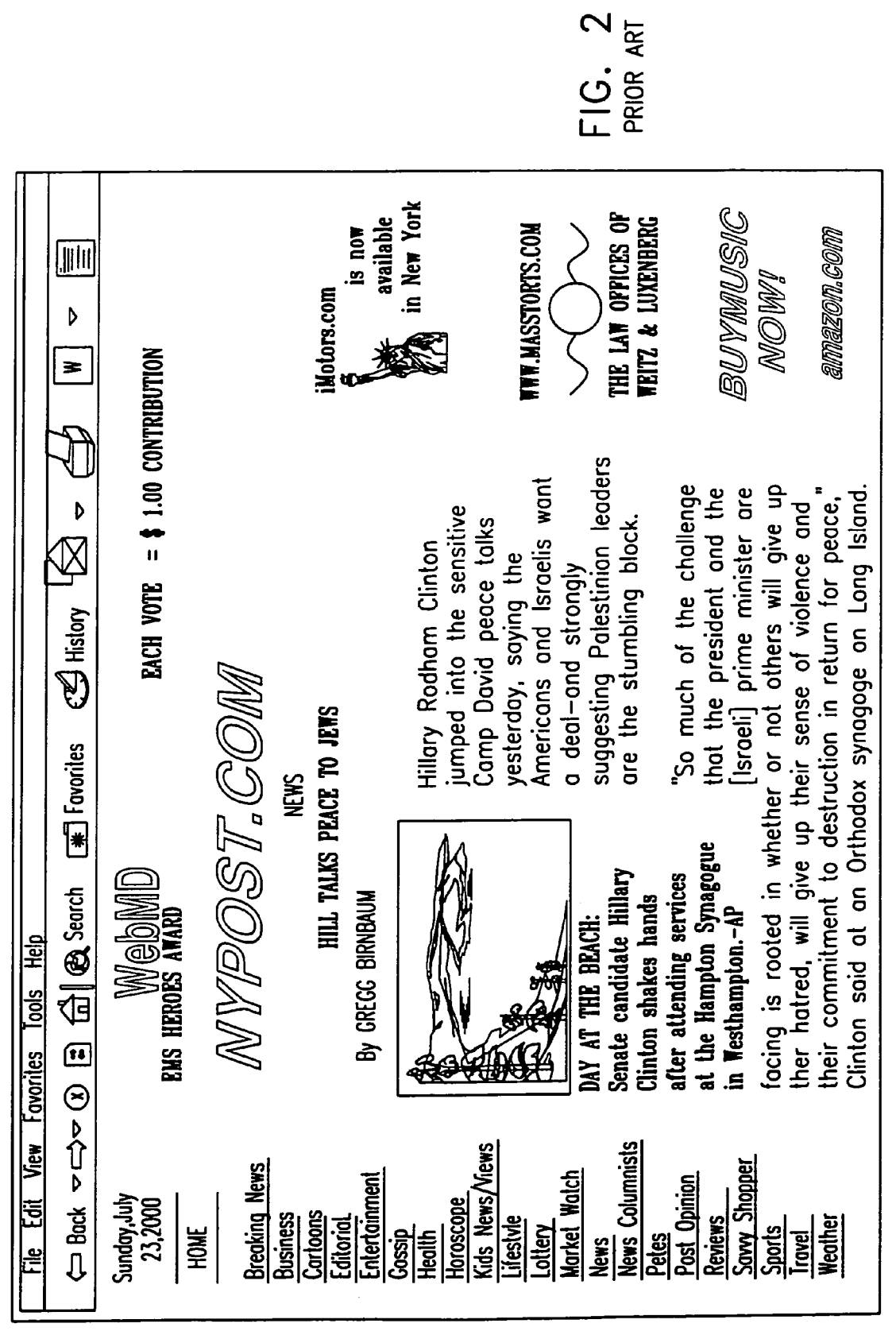
Figure 3:
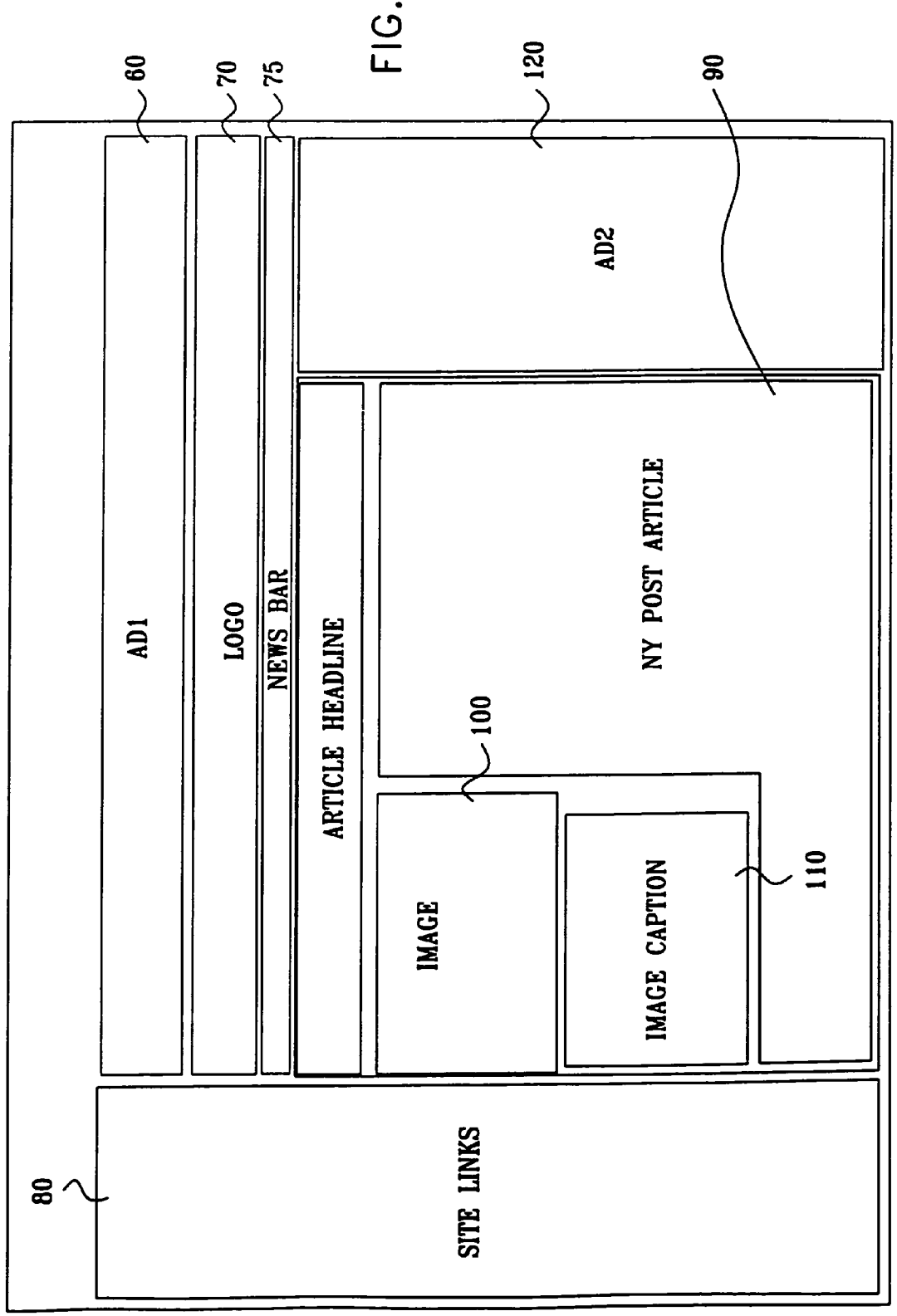
FIG. 3 is a diagram of the typical prior art webpage of FIG. 2.

Dividing the webpage into regions is called, in technical terms, "tables". FIG. 2 shows a typical news article and FIG. 3 shows how the webpage is organized in tables.

A region can be further broken down. An object is the atomic part of a region (cell, in technical terms). Each object has properties.

Table 2 describes the preferred objects and their properties.

TABLE 2

| Object | Properties | | | | |
|---|---|---|---|---|---|
| | Physical location | Logical location | Occurrence | Words matching | Format |
| Link | ✓ | ✓ | | ✓ | |
| Text | | ✓ | ✓ | ✓ | |
| Image | ✓ | ✓ | | ✓ | ✓ |
| Table | | ✓ | ✓ | ✓ | |

Definitions of the properties
1. Physical location—the directory that contains the object file in the servers.
2. Logical location—the place where the object exists on the webpage.
3. Occurrence—the number of alphanumeric strings within a text object or table.
4. Word matching—obtained by the comparison of words/sentences between two objects. The extent to which an object's content resembles the content of the base object of the webpage. Each webpage has a base object, as defined below.
5. Format—for image objects, the relevance of the object by the format type (See Image.Format description in the following subject).
6. The four above-mentioned object types are now described.

Link

In hypertext systems, such as the World Wide Web, a link is a reference to another document which exists usually on the main or in a main subject webpage. Link properties typically include:
Link.Physical location—usually the physical location (directory) of the articles on the domain servers is the same for articles with a common subject e.g. On the NYPOST—all daily news links are in the same directory while other links point to different locations on the NYPOST domain servers.
Link.Logical location—if the link is in a selected region it gets a high grade.
Link.Words matching—if the name of a link matches or resembles the base object.

Text

Words, sentences, paragraphs or article. Text properties typically include:
Text.Logical location—if the region where the text is located gets a high grade, the Text.Logical location property automatically also gets a high grade.
Text.Occurrence—the number of words within the text object.
Text.Words matching—if the text object matches or resembles the base object (see the grades mechanism section for more details), the Text.Words matching property gets a high grade.

Image

An image is a picture that has been created and stored in electronic form. Image properties typically include:
Image.Physical location—the directory that contains the image file in the domain servers.
Image.Logical location—the place where the image is located on the webpage.
Image.Words matching—the image format contains a header with a data field which describes the image content or the article that relates to the image, with the photographer's name copyrighted. If the content of the above mentioned field is related to the base object (see the grades mechanism section for more details), then the Image.Words matching property gets a high grade.
Image.Format—the purpose of the image can be immediately understood by some of the image formats. If the image format is *animated gif, it is more likely that an advertising image rather than an image is being displayed, which is related to the article. Therefore, for some image formats, low grades are given, and high grades are given in others. The application gives a grade to the image format by the file extension and by reading the image data fields in the image file.
*animated gif is a type of gif image that can be animated by combining several images into a single gif file. Applications that support the animated gif standard, GIF89A, cycle through each image.

Table

Refers to data arranged in rows and columns. Table properties typically include:
Table.Logical location—if the region where the table is located gets a high grade, the Table.Logical location property automatically gets a high grade also.
Table.Occurrence—the number of words within the table object.
Table.Words matching—if the table object matches or resembles the base object (see the grades mechanism section for more details), the Table.Words matching property also gets a high grade.

Grading Mechanism

Figure 4:
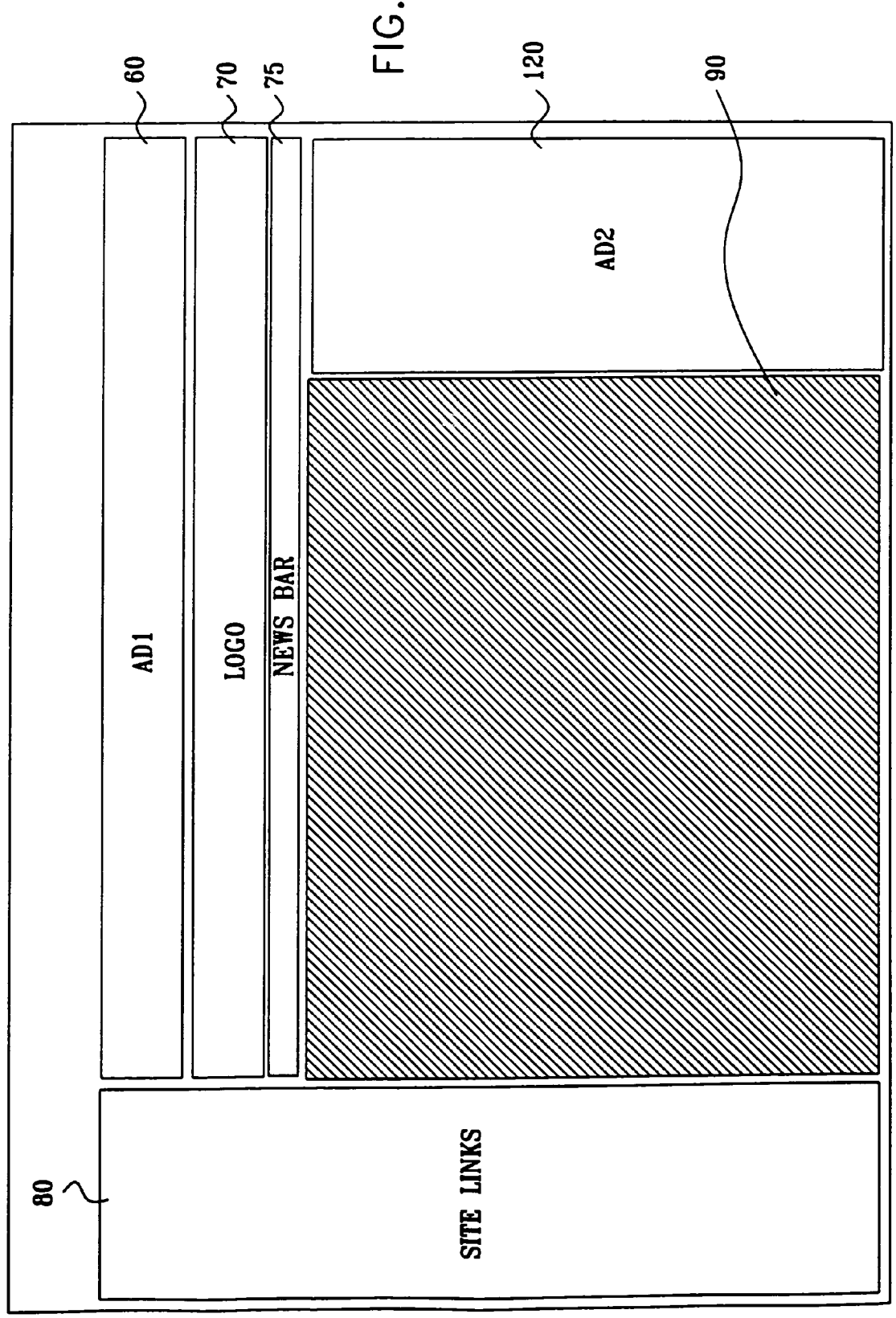
FIG. 4 is an annotated version of the diagram of FIG. 3.

After arranging the webpage into objects by the M2O script language, each object property gets a grade. The total object grade is called weight, which is the average of the object properties grades. The mechanism of selecting the relevant objects is based on selecting the objects with weights that pass the predefined thresholds. In FIG. 4 we can see (marked by diagonal lines) a relevant region that passes the predefined thresholds.

After extensive research and collecting hundreds of webpages, a statistical model is built. Heuristic grades are developed from this model.

All the grades are given in relation to a base object. Typically, the Base Object is the object, which is the biggest in the webpage region. If there is a tie, the object that has the most number of words in it is the base object.

Example for computing object weight (in the given example, the object in an image), the image format is BMP.

The object property grades are:
Image.Physical location=10
The physical location (directory in the server) of the image is not in the same location as the base object. The value is low because there is no relevance of the object property to the base object.
Image. Logical location=100
The logical location of the image is in the relevant region. The value is very high because the object property and the base object match.
Image.Words matching=100
The data field in the image header contains the title that matches the title of the base object.

Image.Format=75
BMP format is not common format for advertising images, but, on the other hand, we cannot determine if the image content is relevant for the article.

The computation for the given example is:

$$\frac{10+100+100+75}{4} = 71$$

Therefore, the current image object weight is 71.

Typical Decision Mechanism

After computing the object weights, a decision mechanism selects the objects e.g. by the following table:

| Object | Thresholds for grades |
|--------|----------------------|
| Link   | 55                   |
| Text   | 60                   |
| Image  | 70                   |
| Table  | 50                   |

Typical Overriding Rules
1. If one region is selected, then all its sub-regions are also selected. For example, in FIG. 4—if the NYPOST article is selected, then the article headline, image and god image caption sub-regions are selected also.
2. If there is more than one text object in a region, a relation is made between the text objects. A relation existence is decided by a word matching process. If there is a relation, a link command is inserted between the two objects.
3. When the base object is selected, all its sub-regions and link objects (generated by the link command) are selected as well.

The Third Level (of FIG. 1): Formatting the Content

Implementing the Process as a Book Style Document

After converting the webpages into M2O script documents as in FIG. 5A, the system builds a master document which includes all the relevant documents, i.e. merging the subjects with their contents, building Preface and Contents at the beginning of the document, inserting Page Numbers and building the alphabetical order of the Index at the end of the document (see FIG. 6).

This level can be divided into 4 phases as shown in FIG. 6:
1. Merging all the documents and forming Chapters and Sections with Titles and Sub-Titles through the entire main document (see FIG. 7).

The merging process typically starts with searching the main document (the main document can be selected by the user) for the "ref" command (for details about the "ref" command see The Second level: Writing M2O script section). After finding such a command, the application takes the document pointed by the "ref" command (string1 field) and searches for the "level" command in the given document (for details about the "level" command see The Second level: Writing M2O script section). For each level command that is found, the application compares the field string2 from the "ref" command with the field ID from the "level" command. After matching the above two fields, the application merges the subject section into the main document. The application stops the merging process when it runs into "end_of_subject" command (for details about the "end_of_subject" command see The Second level: Writing M2O script section).

After merging the specific section, the "level" command stays in the beginning of the section (in the main document) for future processing, but in a new form; that is, without the pointer section which is no longer needed. Therefore, the command typically has the following syntax:
M2O@level [number][subject name].
2. Building Preface and Contents at the beginning of the document.

After the merging process, the application starts the Preface and Contents phase. To check whether a Preface is needed, the application scans the main document until it reaches the "contents" command and checks if the section, until that point, contains text which can be put under a Preface title. For building the Contents, the application reaches the "content" command and replaces it with the Contents table. The Contents table is the result of the process of collecting all the Chapters and Sections with Titles and Sub-Titles throughout the entire main document identified by the "level" command. At that point, there are no page numbers. Yet, it is preferrable to perform this process at this point because the Contents table can change the page numbering of the entire document. At the end of the Contents table, a line called Index is added (only if at least one "index" command is found in the entire document—the minimum number of index commands can be changed by the user), although there is no Index section, at that time, at the end of the document.
3. Insert Page Numbers.

After finishing the Preface and Contents phase, the application initializes a new line counter and starts increasing the counter as it advances along the lines. The number of lines per page is a default value and equal 57, which can be changed by the user. After reaching the number of lines that represent a full page, another counter is initialized—the page counter—and the line counter is reset for a new count. On the bottom of each page, a page numbering command is inserted with the page number value (for details about the "page" command see The Second level: Writing M2O script section). After finishing the page number insertion, the application adds to the Contents section a corresponding page number for each line by searching the identical line, which starts with the "level" command in the document.
4. Building the alphabetical order of the Index at the end of the document.

After the insertion of the page number phase, the last process is building the alphabetical order of the Index.

This process occurs only if at least one "index" command is found in the entire document (the minimum number of index commands can be changed by the user).

The index building process of FIG. 6 typically comprises the following 33 phases as shown in FIG. 8D:
1. Building a list of words and their locations in the document—In this phase, no processing of the document is performed. The process of deciding which word should be put on the Index list takes place in FIG. 1, second level: Writing M2O script. Here the application searches only for the "index" command (for details about the "index" command see The Second level: Writing M2O script section) and adds the words that were found to an index list, including the page numbers where the words were found. If the same word is found twice on the same page, only one occurrence is inserted in the Index list. An example of a word-location list is illustrated in FIG. 8A.

2. Merging identical words with page numbers—In this phase, the application tries to reduce the Index list length by finding identical words with different page numbers. The application then indicates the word followed by a list of all the reference page numbers. FIG. 8B illustrates the word-location list of FIG. 8A, after merging.

3. Sorting out the list in an alphabetical order—the last process is sorting out the index list of words in an alphabetical order and sequencing the page numbers, as shown in FIG. 8C.

The sorted out Index is inserted at the end of the document.

Document Formatting

In this phase, the document is built by processing the M2O script commands which deal with document file format, page layout, and content, as described herein:

1. Document file format—TXT, RTF, DOC, PDF.
2. Document preference:
   i) Paper Size.
   ii) Printing margin definitions.
   iii) Format selections (Font style, Size, Color, bold, underline, italic) for Header and Header levels, Body Text, Caption, Heading.
   iv) Numbering style.
   v) Indentation—For body text and heading text.
   vi) Book cover margin—in case of Book presentation.

There are two main output versions for the document:

Article

If Chapters and Sections with Titles and Sub-Titles do not appear in the document after the third level, only the following changes typically take place:
1. In the second level—irrelevant images/data are taken off.
2. In the third level—page numbering is added.

Book Style Document

The following changes typically take place:
1. In the second level—irrelevant images/data are taken off.
2. In the third level:
3. Preface and Contents in the beginning of the document.
4. Chapters and Sections with Titles and Sub-Titles through the entire document.
5. Page numbering is added in the third level.
6. An alphabetical order of Index at the end of the document.

The Third Level (of FIG. 1): Formatting the Content

Implementing the Process as a Mobile Server

After converting the webpages into M2O script documents as in FIG. 5B, in this level the application extracts the M2O script language and builds the HTML/WML webpage depending on the mobile device browser specification.

The objects that were selected by the Decision mechanism are typically divided into categories:
   Cardinal—the main subject of the webpage (includes the base object).
   Navigation Bar—list of links, which gives the user the ability to navigate to all the sections of the web site.
   Link Cluster—a group of links.
   Logo Image—image of the website's logo.
   Ad—advertisement image.
   Date—A representation, typically in text, of the date.

These categories help reorganize the information in a way convenient to the user when he uses a mobile device, taking into account its screen size and browser limitations. The information may be organized in the following order: the cardinal first, then the Navigation Bar, and finally, all the Link Clusters. In that order, we can retain the user browsing experience, as in the Desktop environment.

Reference is now made to FIG. 9A, which is a simplified pictorial illustration of a system for processing information in accordance with a stand-alone embodiment of the invention. As seen in FIG. 9A, information received by a user over the Internet from one or more web sites 10, is parsed en-route to the user by a parser 12, which may be resident at the user's computer 14 or upstream thereof, and is presented to the user, at-the user's display 16 or other output devices, such as a printer by an information. processor 18, which may be resident at computer 14 or upstream thereof.

Reference is now made to FIG. 9B, which is a simplified pictorial illustration of a system for processing information in accordance with a client-server embodiment of the invention. As seen in FIG. 9B, information received by a user over the Internet from one or more web sites 20 is parsed en route to the user by a parser 22, which may be resident at a server 23, which may be accessed by the user's client computer 24 and is presented to the user, at the user's display 26 or other output device, such as a printer, by an information processor 28, which is typically resident at the server 23.

In accordance with a preferred embodiment of the present invention, the information processor 18 (FIG. 9A) or 28 (FIG. 9B) provides one or more of the following functionalities:

Employing at least some results of the parsing to automatically eliminate at least a pre-selected category of the information;

Employing at least some results of the parsing to differentiate at least one general information portion thereof from at least one specific information portion thereof and to present the at least one general information portion separately from the at least one specific information portion; and Employing at least some results of the parsing to provide a user sensible directory of the information.

Reference is now made to FIG. 10, which is a simplified block diagram illustration of a preferred embodiment of the system of FIG. 9B and to FIGS. 11 and 12, which are simplified flow diagrams of the operation of the system of FIG. 10. FIGS. 10–12 illustrate software implementations in an Internet environment. It is appreciated that the present invention is operative also in a non-Internet environment.

As seen in FIG. 10, a user browser 100 communicates with a client block 102, both of which reside at a user's client. The client block 102 communicates via the Internet with one or more servers on which reside the software elements described herein below:

A client interface block 103 communicates with the client block 102, typically via a GUI communication protocol, and also communicates with a request block 104 and preferably additionally with an optional advertising server 106, including a commercial block 108, receiving advertising content from an advertisement database 110.

The request block 104 also communicates with an application block 112, which receives information from sites on the Internet, and preferably additionally with a user tracking server 114, including a user tracking block 116 which interfaces with a user database 118. User tracking server 114 also communicates with the client interface block 103 and preferably also with the advertising server 106.

The application block 112 communicates with user tracking server 114 and with a format block 120, which in turn communicates with a communications block 122, here termed a "comm block". The comm block 122 provides outputs via the Internet to a user FTP application 124 and/or via a user mail server 126 to a user mail application 128. The comm block 122 may alternatively or additionally provide an output to the user browser 100 via the client interface block 103 and the client block 102.

Preferably, the client interface block 103, request block 104, application block 112, user tracking block 116, format block 120 and comm block 122 all communicate via an intranet, here referred to by reference numeral 130. Advertising server 106, may communicate with the intranet and or may be accessible via the Internet.

Referring additionally to FIG. 11, it is seen that when a user request is made, it is typically communicated between the client block 102 and the client interface block 103, causing a processing request to be sent by client interface block 103 to request block 104. A GUI communication protocol preferably governs all communication between the client block 102 and the client-interface block 103.

The user request and the processing request each typically include a URL that the user wishes to receive information from. The request block 104, upon receipt of the processing request from the client interface block 103, creates a request record and provides user information to the user tracking block 116. Receipt of this information enables the user tracking block 116 to eventually provide a user profile update.

Creation of a request record at the request block 104 initiates an allocation of computation and storage resources for dealing with the request. If sufficient resources are not available, an error message is sent by the request block 104 via the client interface block 103 to the client block 102. As shown, application block 112 is operative to receive data from a URL, via the Internet, analyze the webpage or text data from a URL, via the Internet, analyze the webpage or text file format (FIG. 1, level 1), perform M2O insertion (FIG. 2, level 2), and process the resulting data (FIG. 1, level 3).

Turning again to the user tracking block 116, it is seen that the user tracking block 116 retrieves the user profile and user preferences from the user database 118 and updates them using the user information received from the request block 104. Subsequent to the update, in response to a request from the request block 104, the user tracking block provides to the request block, up to date information regarding user preferences. The request block adds these preferences to the request received from the client interface block 103, thus defining a request record, which is sent to the application block 112.

The application block 112 retrieves data from the user-indicated URL on the Internet, parses the data, filters the parsed data and then processes it. These operations of the application block 112 are described in greater detail herein.

The Application block 112 is responsible for the core processing of the application. This block is responsible for retrieving the information from the requested web site, filtering it and transforming it to an information file with internal script commands for future process (by the format block). The following features are allocated to this block:

1. Information retrieval from the required site
2. Filtering and removal of non-relevant information
3. Building an information file, which represents relevant site structure and information types (text, images, cross-references etc.)

Preferably, the application block 112 performs the level 1, 2, and 3 processing steps of FIG. 1.

Filtered Objects

This section describes typical data objects to be removed from the retrieved information (prior to formatting it. These objects are identified by the application and designated as non-relevant.

Some of the objects that have to be filtered for the implementation of the Book style document version are relevant for the implementation of the mobile server, therefore the symbol ⊙ typically is added to each object that is relevant to the mobile server version.

Banner Advertisements
Advertisement objects that appear in the document in the form of banners. These may include images and/or links. These types of objects usually appear outside the relevant information presentation space.

Image Advertisements
These are images that appear in the HTML page with no relevance to the page subject. These images usually alternate in content for each page download, where size and origin remain the same.

Unrelated, Site Internal Links⊙
These objects are links to additional pages within the same web side or even the same page. These links do not point to other segments of the relevant topic, but rather link to other subjects in the same page.

Bookmarks⊙
These objects are hyper-links for information in the same HTML page, adding no relevant information but aiding on-line browsing. These links have no relevance for off-line, printout reading.

External Links⊙
External links usually point outside the web domain/directory structure. These are links to related sites, advertised sites, sponsor sites etc.

Sound Objects⊙
These are audio objects that play sound and/or music in addition to the text. These objects have no relevance for printout documents.
Sound objects may appear in different types.

Movies⊙
Movie objects are either live streaming or off-line moving pictures. As these objects may not be represented correctly on a printout copy, they are typically omitted.
Movies objects may appear in different types.

Background⊙
This is a background image of the web/HTML page.

Form Objects⊙
These objects include radio buttons, drop down lists, edit boxes and other objects designed to receive user information. As these M objects are designed to receive information from the user, they have no relevance to the web subject.

Animated Images
These images are either advertisements or eye-catching images aimed to "liven-up" the webpage design. As these images have no relevance to the web subject and may not be presented properly on a printout copy, they are typically omitted.

Mail Addresses⊙

These are links for information (e.g., info@blabla.com), site administration (webmaster@blabla.com), etc.

Included Objects

The objects in this section may be included in the information file with internal script commands for future processing-after retrieval from the web.

Body Text

This is the main text object. In cases where the user requires an entire site processinc, there may be several body text objects. In this case, each of these objects typically is processed, and processed as chapters or sections of the final document.

Hyper Links to Related Text

These are links to additional text segments that are considered as relevant, but do not match the user retrieve range (site depth, number of files, disk quota, etc.). These links are designated in the final document in accordance with their perceived part, e.g., sections, paragraphs, references etc.

Stills Images

These objects are images that are related to body text objects. Only images that are relevant to the body text objects are typically included. Other images are typically excluded as advertising or as non-relevant information.

Preface

This is a text object that is included in the original webpage. The original text is either designated or not as a preface in the source web, hence it should be designated as preface during the processing procedure.

Other included objects typically include:

Titles & Headings, Captions, Tables, Bullets, Numbering, Related Articles, URL Details, Page Numbers, Date & Time, Table of Content, Table of Figs., Index Implementing the Process as a Book Style Document User Controllable Parameters in the system of the present invention typically include some or all of the following:

Retrieve Depth

Filter Settings

The user is able to set specific filtering criteria for some objects in order to enhance the application sensitivity to specific objects (either to include or exclude these objects).

Key Word Export

The application block 112 of FIG. 10 exports a list of key words from the processed information to the user tracking block 116 of FIG. 10. These keywords are used to classify the current user request in terms of fields of interest.

The key words are selected in accordance to occurrence and significance (words that appear in titles, bold, etc.).

Referring again to FIG. 10, following successful data processing of the data retrieved from the user-indicated URL on the Internet, the filtered and processed data is provided to the format block 120. Site keywords in the data retrieved from the user-indicated URL is provided to the user-tracking block 116 for processing and updating the user profile stored in user database 118.

A general description of the format block 120 is set forth herein below:

The Format block is responsible for transforming the processed information into a user file. This includes the following functions:

I. Document style—book structure, pamphlet, booklet, etc.
II. Document structure—multiple formats are typically supported (pdf, doc, rtf, ps etc.)
III. User preferences overlay (fonts, colors, paper size etc.)
IV. File compression.

I. Identify Format Preferences

For example, the following Document format styles may be supported:

a) Book format style of FIG. 12—Book presentation with book cover margins. The Book typically has the following structure:
   1. Opening Page, e.g. as described below.
   2. Ad Page, containing advertisements.
   3. Table of Contents-
      During the building process, information for the Table of Contents typically is gathered from the Title property with M2O script commands.
   4. Table of FIGS..
      During the building process, information for the Table of FIGS. typically is gathered from the Image Caption property with M2O script commands.
   5. Table of Tables.
      During the building process, information for the Table of Tables typically is gathered from the Table Caption property with M2O script commands.
   6. Body Text.
   7. Index.
      During the building process, information for the Table of Figs. typically is gathered from the Key words property with M2O script commands.
   8. References.
      During the building process, information for the References typically is gathered from the Link property with M2O script commands.
b) Article—looks like Book format style of FIG. 12, but without cover margins and without Table of Contents, Table of FIGS., and Index:
   1. Opening Page, e.g. as described below.
   2. Ad Page, containing advertisements.
   3. References.
c) Pamphlet—Newspaper look as shown in FIG. 13, includes:
   1. Opening Page, e.g. as described below.
   2. Ad Page, containing advertisements.
   3. References.

In case the user does not specify the exact style he desires, according to the number of webpages & Titles, an appropriate style is selected (auto detection).

The Opening Page of a book, article, pamphlet, or newspaper printout generated by the system of the present invention, typically includes the following information:
1. Date & Time of the user request.
2. Request Properties—all the user request properties from the user request structure:
   User information (name, address, email).
   URL details—all the URLs that the information was taken from.
   Grabbing depth.
   Request Filters.

Format Properties—all the Document preferences (see document preferences).

II. Document Format Structure

The Document format structure that is supported may include:
1. RTF—Rich Text Format.
2. PDF—Portable Document Format.
3. Doc—Microsoft Word Document.

III. Document Preferences

The Document preferences typically are taken from the user request structure. The Document preferences that are typically employed for the building process are:

Paper Size.

Printing margin—Including Margins left, right, up, and down definitions.

Font—Font name, Size, Color, Style (bold, underline, italic) for the following:
1. Header.
2. Body Text—Regular body text.
3. Caption—Images & Table captions.
4. Heading—Title & sub title
   Heading Numbering style.
   Indentation—For body text and heading text.
   Book cover margin.

IV. File Compression

The file generated after the Document Building process typically passes a compression sequence, with one of the compression engines available in the market.

Page Layout

The building process typically takes into consideration the frame layout found in the original web site but with these assumptions:
   When encountering paragraph containing image and a following paragraph containing text, the text typically is side by side with the image (The image in right alignment) as long as the image does not occupy more then ¾ of the page width. If this is the case, the text typically is placed after the image.
   If the image has a caption property, the caption typically is treated as part of the image with regard to the side-by-side text.
   When encountering paragraph containing Table and a following paragraph containing Text, the text typically is placed after the Table.

Page Break

The building process shown in FIG. 1, level 3 typically operates a smart page break mechanism to identify a need to insert a Page Break so as to preserve pleasant appearance of each page.

In some cases, a paragraph may need more space than is available on the current page (see FIG. 14).

If the paragraph belongs to a new subject (new webpage and the paragraph have a Title property) a page break is inserted before the paragraph. If not, the mechanism takes into consideration the current page space available (B) and the ratio between the two paragraph parts (X and Y):
1. If the paragraph can fit into the current page (B) the paragraph is inserted into that page. Otherwise,
2. If there is no Title property to the paragraph:
   If the current page is less then 4 full the paragraph is cut into two pieces. One (X) is placed on the current page and the other (Y) on the next one (see FIG. 15).
   If the current page is almost fully occupied (more then 4) the paragraph (X+Y) moves to the next page (see FIG. 16).
3. If there is a Title property to the paragraph:
   If the current page is less then ¾ full:
   If X>>Y then the paragraph is cut into two pieces. One (X) is placed on the current page and the other (Y) on the next one (see FIG. 15).
   Else a page break is inserted and the entire paragraph (X+Y) is inserted onto the next page (see FIG. 16).
   If the current page is almost fully occupied (more then ¾) the paragraph (X+Y) moves to the next page (see FIG. 16).

Page Numbering

The pages on the document typically are numbered from the first body text.

Table of Contents

During the building process, information for the Table of Contents typically is gathered from the Title property with M2O script commands.

Table of Figs.

During the building process, information for the Table of Figs. typically is gathered from the Image Caption property with M2O script commands.

Table of Tables

During the building process, information for the Table of tables typically is gathered from the Table Caption property with M2O script commands.

Index

During the building process, information for the Table of Figs. typically is gathered from the Key words property with M2O script commands.

References

During the building process, information for the References typically is gathered from the Link property with M2O script commands.

File Compression

The file generated after the Document Building process typically passes a compression sequence, with one of the compression engines available in the market.

Referring again to FIG. 10 in format block 120, the received, filtered and processed data is formatted and then compressed. Following successful data compression, the compressed data is supplied to the comm block 122. The comm block 122 may communicate the compressed data in one or more of typically three ways, in a push mode such as by e mail via the user mail server 126, by FTP via the user FTP application 124 or in a pull mode by using the user browser 100, via the client block 102 and the client interface block 103.

Reference is now made to FIG. 17, which is a simplified flow diagram of the operation of the system of FIG. 10 to provide optional advertising functionality. In this embodiment of FIG. 10, advertising server 106 is provided. As seen in FIG. 17, the client block 102 provides client status information via the client interface block 103 to the commercial block 108 of the advertising server 106.

The commercial block 108 retrieves advertising demographics and a user profile indicating user preferences from the user database 118 of the user tracking server 114 via the user tracking block 116. Based on these demographics and the user profile, the commercial block 108 extracts appropriate advertisements from the advertisement database 110 and provides those advertisements to the client block 102 via the client interface block 103.

In addition, in accordance with one embodiment of the present invention, the application block 112, following its data filtering step as described hereinabove with reference to FIG. 11 and typically within the context of its data processing step, requests and obtains from the commercial block 108 advertisements for inclusion in the data supplied to the user via the format block 120 and comm block 122, as described hereinabove with reference to FIG. 11. It is appreciated that these advertisements are typically selected on the basis of the user's demographics and user profile.

Reference is now made to FIG. 18A, which is a simplified pictorial illustration of a system for processing information for display on wireless devices in accordance with one preferred embodiment of the invention.

As seen in FIG. 18A, information received over the Internet from one or more web sites 210 is parsed en-route to the user by a parser 212, which may be resident at a server 214 which may be located at the premises of a content provider, of a wireless portal or of a wireless operator, and is presented to the user on the display 216 of a wireless device, such as a WAP-enabled cellular telephone 218, by an information processor 220, which may be resident at server 214, upstream or downstream thereof.

It is a particular feature of the embodiment of FIG. 18A that it provides a methodology for processing information received by a wireless device over a computer network including receiving information from at least one source of information over a computer network, parsing at least some of that information; and employing at least some results of the parsing to provide the information in a form suitable for display to a user on the wireless device. In the illustrated embodiment of FIG. 18A, the wireless device is a conventional WAP-enabled cellular telephone.

It is noted that the present invention is capable of presenting the information contained in any web-site, not limited to web sites that are WAP configured and to automatically present that information in a conveniently readable form to a user on the display of a wireless device. Thus, in FIG. 18A, it is seen that only the news content from the web site is displayed and the banners and links which appear at the web site are not displayed on display 216.

Reference is now made to FIG. 18B, which is a simplified pictorial illustration of a system for processing information for display on wireless devices in accordance with another preferred embodiment of the invention.

As seen in FIG. 18B, information received over the Internet from one or more web sites 260 is parsed en-route to the user by a parser 262, which may be resident at a server 264 which may be located at the premises of a content provider, of a wireless portal or of a wireless operator, and is presented to the user on the display 266 of a personal digital assistant (PDA) 268 which is typically coupled to the serial port 270 of a wireless communication device, such as a modem-equipped cellular telephone 272, such as a Samsung 811i. The information displayed on display 266 is processed by an information processor 274, which may be resident at server 264, upstream or downstream thereof.

It is a particular feature of the embodiment of FIG. 18B that it provides a methodology for processing information received by a PDA via a wireless device over a computer network including receiving information from at least one source of information over a computer network, parsing at least some of that information; and employing at least some results of the parsing to provide the information in a form suitable for display to a user on a PDA via a wireless device. In the illustrated embodiment of FIG. 18B, the wireless device is a modem-equipped cellular telephone. The PDA 268 may be any suitable PDA, such as a Palm Pilot.

As noted above in connection with FIG. 18A, the embodiment of FIG. 18B is capable of presenting the information contained in any web-site, not limited to web sites that are wireless-configured and to automatically present that information in a conveniently readable form to a user on the display of a wireless device. Thus, in FIG. 18B, it is seen that only the news content from the web site is displayed and the banners and links which appear at the web site are not displayed on display 266.

Reference is now made to FIG. 18C, which is a simplified pictorial illustration of a system for processing information for display on wireless devices in accordance with another preferred embodiment of the invention.

As seen in FIG. 18C, information received over the Internet from one or more web sites 310 is parsed en-route to the user by a parser 312, which may be resident at a server 314 which may be located at the premises of a content provider, of a wireless portal or of a wireless operator, and is presented to the user on the display 316 of an integrated personal digital assistant and cellular telephone 318, such as a Samsung I-MAX, which incorporates a modem-equipped cellular telephone. The information displayed on display 316 is processed by an information processor 320 which may be resident at server 314, upstream or downstream thereof.

It is a particular feature of the embodiment of FIG. 18C that it provides a methodology for processing information received by an integrated PDA and wireless device over a computer network including receiving information from at least one source of information over a computer network, parsing at least some of that information; and employing at least some results of the parsing to provide the information in a form suitable for display to a user on an integrated PDA and wireless device.

As noted above in connection with FIG. 18A, the embodiment of FIG. 18C is capable of presenting the information contained in any web-site, not limited to web sites that are wireless-configured and to automatically present that information in a conveniently readable form to a user on the display of a wireless device. Thus, in FIG. 18C, it is seen that only the news content from the web site is displayed and the banners and links which appear at the web site are not displayed on display 316.

Reference is now made to FIG. 19, which is a simplified block diagram illustration of a preferred embodiment of the system of FIGS. 18A–18C.

As seen in FIG. 19, an HTML/WML browser 400 which is resident in a wireless device 402, such as a WAP-enabled cellular telephone 218 (FIG. 18A), a PDA 268 which is typically coupled to the serial port 270 of a wireless communication device, such as a modem-equipped cellular telephone 272 (FIG. 18B) or a integrated PDA and modem equipped cellular telephone 318 (FIG. 18C) communicates via the Internet with one or more web sites 404, each web site being identified by a URL.

Associated with each web site is a server 406 on which resides the software elements described hereinbelow:

An interface block 408, which communicates with the web site and also communicates with a request block 410 and preferably additionally with an optional advertising server 412, including a commercial block 414, receiving advertising content from an advertisement database 416.

The request block 410 also communicates with an application block 418, which receives information the web site 404, and preferably additionally with a user tracking server 420, including a user tracking block 422 which interfaces with a user database 424. User tracking server 420 also communicates with the interface block 408 and preferably also with the advertising server 412.

The application block 418 communicates with a format block 426.

Preferably, the interface block 408, request block 410, application block 418, user tracking block 422 and format block 426 all communicate via an intranet, here referred to by reference numeral 430. Advertising server 412, may communicate with the intranet and or may be accessible via the Internet.

It is noted that when a user request is made, it is typically communicated between the wireless device 402 and the interface block 408, causing a processing request to be sent by interface block 408 to request block 410.

The user request and the processing request each typically include a URL that the user wishes to receive information from. The request block 410, upon receipt of the processing request from the interface block 408, creates a request record and provides user information to the user tracking block 422. Receipt of this information enables the user tracking block 422 to eventually provide a user profile update.

Turning again to the user tracking block 422, it is seen that the user tracking block 422 retrieves the user profile and user preferences from the user database 424 and updates them using the user information received from the request block 410. Subsequent to the update, in response to a request from the request block 410, the user tracking block provides to the request block, up to date information regarding user preferences. The request block adds these preferences to the request received from the interface block 408, thus defining a request record which is sent to the application block 418.

The application block 418 retrieves data from the user-indicated URL on the Internet, parses the data, filters the parsed data and then processes it. These operations of the application block are described in greater detail hereinabove in connection with FIGS. 10–17.

Reference is now made to FIGS. 22–27 which are pictorial illustrations of webpage content displayed on a small screen after being processed by a preferred embodiment of the present invention. The webpage whose content is displayed, is illustrated in prior art FIG. 28.

In prior art systems for displaying webpage content on small screens such as mobile telephone screens, PDA (personal digital assistant) screens and palm computer screens, a horizontal scroll is often required to read lines of text which are longer than the screen width. In other prior art systems such as the PalmPilot browsers, text appearing on the webpage to be displayed is reformatted with margins which fall within the width of the screen, however there is no contextual analysis of the text and consequently, no filtering of irrelevant text and no formatting of the text and more generally no differential treatment of texts having different contextual significance in contrast, the system of the present invention preferably provides text with margins falling within the width of the screen, which is typically identified automatically, such that horizontal scrolling is unnecessary. The text is typically filtered and/or reformatted such that the format matches the context in some way. For example:

a. advertising text may be identified and discarded. The discard feature characterizing a preferred embodiment of the present invention has the advantage of sparing the user contact with information which he does not wish to view, and additionally has the advantage of increasing browsing speed since some of the information is omitted.

b. the order in which information is displayed may be changed e.g. such that important contexts precede less important contexts.

c. differential text size may be employed to represent differential contexts e.g. important texts may be identified and larger fonts may be employed to represent them.

Typically, the system of the present invention is operative to perform a contextual analysis and use at least one result of this analysis in order to represent the information appearing on the webpage as a column whose width corresponds to the width of the screen. A particular advantage of this feature of a preferred embodiment of the present invention is that the user can easily peruse the webpage merely by operating a vertical scroll bar.

Preferably, the system of the present invention is operative to automatically identify text whose font is too small to be easily readable and to increase the font size accordingly.

The system of the present invention is also selectively operative to adjust one or both dimensions of graphic elements so as to fit them into the dimensions of the small display while preventing unacceptable distortion of the content represented thereby.

FIGS. 29–30 are pictorial illustrations of web page content displayed on a very small screen without graphic capabilities, after being processed by a preferred embodiment of the present invention. This embodiment of the invention is particularly suited to WAP (wireless application protocol) communication.

Referring back to FIGS. 5A–5B, these represent methods for parsing suitable for implementing level 2 in FIG. 1. The output of the level 2 parsing step typically comprises an object tree such as that illustrated in FIGS. 34–35. However, preferably, level 2 of FIG. 1 is implemented based on using Microsoft Shdocvw.dll to Parse HTML, Frames, Java and VB Scripts and to perform any other functionality that is used to support input of Internet documents and output of a document for a Web Browser.

FIG. 32 illustrates an architecture of the above parser. As shown, Shdocvw.dll hosts the Mshtml.dll component, as well as any other Active Document component (such as a Microsoftr Office application) that can be loaded in place in the browser when the user navigates to a specific document type. Shdocvw.dll supplies the functionality associated with navigation, in-place linking, favorites and history-management, and PICS support. This DLL also exposes interfaces to its host to allow it to be hosted separately as an ActiveX control. The Shdocvw.dll component is more frequently referred to as the WebBrowser control.

Mshtml.dll is the component that performs the HTML parsing and rendering in Internet Explorer 4.0 and up, and it also exposes the HTML document through the Dynamic HTML Object Model. This component hosts the scripting engines, Microsoft virtual machine, ActiveX Controls, plug-ins, and other objects that might be referenced in the loaded HTML document. Mshtml.dll implements the Active Document server interfaces, which allows it to be hosted using standard COM interfaces.

Alternatively, other HTML Parsers are also readily available in the market such as Wise Systems WebWise, an HTML template parser, and AppWatch HTML Parser.

Alternatively, there are commercially available parsers in the market for various other parsing requirements and document types, such as: HEX—The HTML Enabled XML Parser, Microsoft XML Parser Version 3.0, GJP—GTK based Java Classfile parser, RTF-Parser-1.07—RTF to HTML converter and Logictran RTF Parser.

FIG. 33 is a simplified flowchart illustration of a preferred method for performing any of the three M2O conversion functions of Level 2 in FIG. 1. Preferred methods for performing the parsing step 1650 in FIG. 33 are illustrated in FIGS. 5A and 5B.

FIG. 34 is an example of an object tree generated by parsing the webpage of FIG. 28, except for the children of element 88 (Table), which themselves form an object tree and which are not illustrated in FIG. 34. The tree of descendants of 88 (Table) is illustrated in FIG. 35. The correspondence between the elements of the object tree of FIGS. 34–35 and the components of the webpage of FIG. 28 is apparent from comparing the reference numerals 1701–1728 appearing on FIGS. 34–35 with the same reference numerals appearing on FIG. 36 which is a pictorial illustration of the components of the webpage of FIG. 28.

The objects in the object tree are graded in step 1660, in order to assign a weight to each object in the tree. In step 1670, a decision is made by thresholding the weights determined in step 1660. Typically, different thresholds are used for different types of objects. For example, text objects may have a lower threshold than image objects. Generally, object types for which there is a high degree of confidence that their weights accurately reflect their importance are assigned a relatively high threshold. Conversely, object types for which there is a low degree of confidence that their weights accurately reflect their importance are assigned a relatively low threshold to prevent important information from being inadvertently discarded.

A preferred method for performing the grading step 1660 of FIG. 33 is now described. Typically, the objects are partitioned into the following types: link, text, image and table. Each of these object types typically has defined properties e.g. as shown in Table 2.

Typically, the "word matching" property is computed by performing a key word matching process. In this process, each word within the object whose "word matching" property is being computed, is taken up in turn and the system determines whether this word occurs in the base object. The system counts the number of words in the object which do occur in the base object. The proportion of words in the object which occur in the base object, from among the total number of words in the object, typically determines the "word matching" property of the object.

The "word matching" property of images is typically determined by comparing the header of the image format to the base object and computing the proportion of words in that header which appear in the base object.

The "word matching" property of links is typically determined by comparing each hierarchical component of the link (which typically comprises a word) with the base object.

The "physical location" property of an object such as a link or image is computed by comparing the directories that contain that object and the base object. The number of hierarchical levels which separate the two directories is the "physical location" of the link or image.

The "logical location" of an object which is interiorly disposed relative to the base object is the maximum value e.g. 100. The "logical location" of any other object is the distance, on the webpage, of that object from the base object.

The weighting assigned to each object typically comprises a combination of the object's properties such as a simple average of the object's properties.

An example of a suitable set of thresholds for performing decision step 1670 is as follows:
Links—55
Texts—60
Images—70
Tables—50.

Preferably, overriding rules are defined which typically define discarded objects which are to be restored i.e. are ultimately not discarded after all. For example, some or all of the following overriding rules may be employed:
a. objects which are disposed interiorly of a selected object, on the webpage, are not discarded. For example, if a photo object is maintained then a photo caption object within the photo object (which may include a photo image object and the photo caption object) is also maintained even if its weights cause it to be discarded. Another example is that a link within a base object is retained.
b. objects which have a high word-matching score are retained even if their total weight is low.

A preferred method for formatting a small display to contain all objects which survive the decision step 1670 is now described.
I. First, the objects are typically divided into, or preferably partitioned into categories typically including some or all of the categories in the following classification:
a. Cardinal—Object or group of objects pertaining to the main subject of the webpage. This category includes the base object, if one of the objects in the object tree is the base object, or all objects forming the base object, if the base object is a composite of several objects in the object tree as described above.
b. Navigation bar—Display of links via which the user navigates throughout the website.
c. Link cluster—Display of links which appears at a particular location within a particular webpage and typically is relevant in some sense to the information adjacent thereto on that webpage.
d. Ad—Advertisement image.
e. Logo Image of the website's logo
f. Date—A representation, typically in text, of the date.

Preferred methods for classifying an object as belonging to each of the above categories are described below.

Classifying one or more objects as cardinal: As described, a base object is selected which is the largest object on the webpage. If there is a tie, i.e. if the largest two or more objects are similar, to a predetermined extent, in size, then the object with the most words in it is typically deemed to be the base object.

Preferably, if the base object is not very big, e.g. falls below a threshold defining the minimum size for a base object, then objects adjacent to the base object are combined with the base object to generate a "cardinal" of adequate size. This "cardinal" is used in the Level 3 formatting process described below. Typically, the adjacency is not physical adjacency on the webpage but rather adjacency within the hierarchy defined by the object tree. Typically, only objects within the same hierarchy level are considered adjacent. The minimum base object size is typically defined in terms of the proportion of the webpage which the object occupies. A typical threshold value is 30%.

Once the cardinal exceeds the minimum threshold size of, say, 30% of the webpage, either because a base object was found which exceeds 30% or because objects adjacent to the base object were added, along with the base object, to the cardinal, all maintained objects, i.e. objects which survived decision step 1520 in FIG. 33, are typically added to the cardinal.

Finally, any objects within the cardinal which are found to fall within any of the other categories (Navigation bar, Link cluster, Ad, or Loao) is removed from the cardinal.

Classifying an object as a navigation bar: Typically, only one object is classified as a navigation bar, even if the webpage includes several navigation bars as in FIG. 28, and the object so classified is typically the most comprehensive of the navigation bars, which normally includes the content of the other nagivation bars. Therefore, the navigation bar classification step typically comprises identifying the object in the webpage which is most suitable to be deemed a navigation bar. To do this, the objects are all examined to identify one or more objects which have a suitable navigation bar profile. If no such objects are found, the webpage is deemed to lack a navigation bar. One suitable profile is the following logical combination of characteristics: ((a and b and c or d and a) and e) or f where characteristics a–f are defined as follows:

a. has the largest number of links;

b. a predetermined proportion, e.g. at least half, of the links are links to locations within the domain (website) rather than to locations outside the domain such as to other domains.

c. the number of links is no greater than the number of internal links whose last character is a forward slash.

d. the last character of each of the internal links is a forward slash.

e. the object must be visible in the first screen of the webpage.

f. less than a predetermined proportion of the objects on the webpage are links e.g. the proportion of objects in the webpage which are links is less than 30 percent.

If more than one object on a webpage satisfies the above logical combination of characteristics, the object with the largest area from among this set of objects is selected as the navigation bar.

However, if the HTML code indicates that the web page includes a map whose name includes the name "nav" or "menu" this map is typically selected as the navigation bar.

Classifying an object as a link cluster: An object is typically classified as a link cluster if:

a. it is of type TD or type DIV; and b. at least a certain proportion, such as 60% of the area of the object, includes links; and c. the number of links in the object falls within a predetermined range such as between 3 and 200 links; and d. the number of strings (words) in the object which are not within links is a relatively small proportion of, e.g. no more than 40% of, the number of strings (words) in the object which are within links.

Classifying an object as an advertisement: An object having the following logical characteristic: (a or b) and c where characteristics a, b and c are defined as follows:

a. An object whose HTML code is characterized in that its file name=one of the following reserved words: ads, adv, coupon, commerce, adserver, sponsor, or in that its ALT name (the name of an image on which a mouse is resting)=one of the above reserved words, or in that its ID=one of the above reserved words.

b. The object's size is one of the conventional advertisement sizes, such as 120 mm×90 mm, 120 mm×240 mm or 468 mm×60 mm; and the object is external to the cardinal.

c. The link points to a location which is outside of the domain.

Classifying an object as a logo: First, the method selects all objects satisfying that:

a. its HTML code is characterized in that its file name=one of the following reserved words: ads, adv, coupon, commerce, adserver, sponsor, or in-that its ALT name (the name of an image on which a mouse is resting)=one of the above reserved words, or in that its ID=one of the above reserved words; and b. the logo links to a location within the domain rather than to a location external to the domain; and c. the object is located adjacent to the top edge of the webpage.

From among the selected objects, a single logo is chosen which points to the domain's homepage. If there are more than one such objects, the selected object is the largest of the selected objects which points to the homepage.

Classifying an object as a date: An object is deemed to be a date if it has a relatively small number of characters, e.g. less than 40 and it includes character strings which are typical of date information such as a month name (January, . . . , December or an abbreviation thereof), a day of the week, PM, AM, etc.

Once the objects have been partitioned, typically, into the above categories, VisibleTable objects are defined from among the objects making up the Cardinal. A VisibleTable object is a table-type object within the cardinal, which is wider than the width of the screen, and which therefore it is desired to view as is, using horizontal scrolling as necessary. Objects other than VisibleTables are typically reformatted to accomodate the width of the screen and thereby obviate the need for horizontal scrolling.

To determine whether a table object is or is not a VisibleTable object, the HTML code is examined. If the border field in the Table command is zero, and the table's background color is different from the webpage's background color, and the size (no. of rows×no. of columns) is at least 3×2, and (optionally) the cells defined by the rows and columns are all equal in size and each of the cells has text content i.e. is not empty, then the table object is a VisibleTable object.

Next, a display is prepared which typically sequences the information in a suitable order such as the following order: logo, date, cardinal, link cluster/s originating in the cardinal, navigation bar, ads (if server is configured to display them). Link clusters which do not originate in the cardinal are typically discarded and not displayed. In preparing the display, each image is resized to fit the display width. Typically the aspect ratio of each image is substantially or entirely maintained. Text is typically upsized, e.g. by increasing the font size, because text of any specific font usually is displayed smaller on a small screen than it is on a large screen, such as the computer screen displaying a webpage.

The display width is known by accessing a table which stores a plurality of preconfigured information elements, including display width, characterizing each of several wireless devices. The table is typically manually constructed and stored in the server. Typically the key according to which the table is accessed is the contents of the user agent data field in the HTTP (hypertext transfer protocol) header of the request arriving from the mobile device to be served. A conventional request header is described in http://www.w3.org/Protocols/HTTP/HTRQ_Headers.html.

Another information element differentiating between different wireless devices is the type of browser employed by each device. This information determines whether special features such as images, JAVA script, dynamic HTML and frames structure are supported. The system of the present invention typically stores a table associating with each type of browser the special features supported thereby, and a table associating each type or brand of mobile device, as stored e.g. in the user agent data field, with the type of browser that mobile device employs. This allows the system of the present invention to provide a display format which is suited to the capabilities of the mobile device with which it is currently interacting.

Optionally, the system may identify the type of webpage being analyzed and may analyze differentially depending on the type of webpage. For example, analysis may differ for homepages and for pages which are not homepages because homepages typically share common characteristics which are not typically shared by webpages other than homepages. For example, the definition of cardinal (typically the values of the thresholds in the definition) may be modified, for homepages, to cause homepages' cardinals to include more information. Another example is that catalog-type pages, as opposed to article-type pages may be identified and differentially analyzed. For example, text in an article-type page may be treated as more important, relative to text in a catalog-type page. The base object may for example be defined as the object having most words rather than the object occupying the largest area.

A CD-ROM Appendix is enclosed herewith from which can be derived files which, taken together, constitute the following two preferred embodiments of the present invention:

a. a first embodiment which displays webpage content on a small screen; and
b. a second embodiment which displays webpage content in hard copy form e.g. in book form.

In order to generate a system implementing the first, "small screen", embodiment, based on the CD-ROM appendix, the following method may be employed:

A1. Provide an Intel compatible computer with a minimum of 128 MB RAM and 600 Mhz CPU. Install a Windows 2000 Professional operating system (or newer version) installed with an Internet Information Server (hereinafter referred to as "IIS") 5.0 (or newer version) server.
A2. Copy the file IMP.HEX in the \apndx-I\IMP folder stored in the appended CD-ROM into a temporary directory.
A3. Unhex the computer listing IMP.HEX mentioned in step A2 using HEX IT V1.8 or greater by John Augustine creating file IMP.ZIP
A4. Decompress the file IMP.ZIP using WINZIP version 6.2 or greater, extracting all files into a temporary directory.
A5. In IIS, create a virtual directory named: Infogin and allow Execute permissions.
A6. In IIS Default Web Site Properties, Install the InfoginFilter.dll.
A7. Restart the IIS Service.
A8. Run InfoginControl.exe.
A9. Set the NT Internet User to have full permissions on the Infogin sub tree in the Registry (Using Windows 2000 RegEdt32.exe).
A10. Run InfoginAlgorithem.exe In order to generate a system implementing the second, "hard copy", embodiment, based on the CD-ROM appendix, the following method may be employed:

B1. Provide an Intel compatible computer with a minimum of 128 MB RAM and 600 Mhz CPU. Install a Windows 2000 Professional operating system (or newer version).
B2. Provide a MS SQL Server Version 7 (or newer version).
B3. Install the DB Structure that appears in the tables of FIGS. 31A–31D on the SQL Server.
B4. Copy the file BOOKGEN.HEX in the \apndx-II\BOOKGEN folder stored in the appended CD-ROM into a temporary directory.
B5. Unhex the computer listing BOOKGEN.HEX mentioned in step B4 using HEX IT V1.8 or greater by John Augustine creating file BOOKGEN.ZIP
B6. Decompress the file BOOKGEN.ZIP using WINZIP version 6.2 or greater, extracting all files into a temporary directory.
B7. Copy file: midas.dll from the temporary directory used in step B6 to directory C:WINNTsystem32. midas.dll is a file originally supplied by Borland with the Delphi Compiler.
B8 Install the following Com components:
Application.MSI
CommBlock.MSI
Format.MSI
Manager.MSI
UserTracking.MSI
B9. Create App-sql Data Source Name (DSN) from Administrative ToolsData Sources (ODBC).
B10. Run the following applications:
App_Organizer.exe
ClientBasePRJ.exe
Clbexe.exe
ReqSeq.exe
HTMLRetrievePrj.exe
B11. Set server machine and Objects running on Clbexe.exe.
B12. Add Client Base Hosts in ClientBasePRJ.exe.
B13. Allow Internet access.
B14. Create Shared File directories: FileRetrieved, ErrorLogs.
Configure all executive applications mentioned in step B10 in dcomcnfg.exe
located in C:\WINNT\system32 as follows:
General-Authentication Level to None.
Security-Custom Access permissions to everyone allow access.
Security-Custom Launch permissions to everyone deny access.
Identity to Interactive user.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather the scope of the present invention includes both combinations and subcombinations of the various features described hereinabove as well as variations and modifications which would occur to persons skilled in the art upon reading the specification and which are not in the prior art.

The invention claimed is:

1. A method for processing information received by a wireless device via a server over a computer network from a web site, comprising:
   receiving information at said server from said web site over said computer network;
   at said server, parsing at least some of said information; and
   at said server, employing at least some results of said parsing to provide said information in a form suitable for display to a user on said wireless device by classifying said information according to its importance to a user.

2. A method for processing information received by a wireless device according to claim 1 and wherein said wireless device is a wireless telephone and wherein at least some results of said parsing are employed at said server to provide said information in a form suitable for display to a user on said telephone.

3. A method for processing information received by a wireless device according to claim 1 and wherein said wireless device is a wireless personal digital assistant and wherein at least some results of said parsing are employed at said server to provide said information in a form suitable for display to a user on said personal digital assistant.

4. A method for processing information received by a wireless device according to claim 1 and wherein said wireless device is a wireless telephone and personal digital assistant and wherein at least some results of said parsing are employed at said server to provide said information in a form suitable for display to a user on said telephone and personal digital assistant.

5. A method for processing information according to claim 1 and wherein at least some of the results of the parsing are employed for classifying said information according to its importance to a user in accordance with user-selected importance criteria and wherein said display of said information is at least partially in accordance with results of said classifying of said information.

6. A method for processing information according to claim 2 and wherein at least some of the results of the parsing are employed for classifying said information according to its importance to a user in accordance with user-selected importance criteria and wherein said display of said information is at least partially in accordance with results of said classifying of said information.

7. A method for processing information according to claim 3 and wherein at least some of the results of the parsing are employed for classifying said information according to its importance to a user in accordance with user-selected importance criteria and wherein said display of said information is at least partially in accordance with results of said classifying of said information.

8. A method for processing information according to claim 4 and wherein at least some of the results of the parsing are employed for classifying said information according to its importance to a user in accordance with user-selected importance criteria and wherein said display of said information is at least partially in accordance with results of said classifying of said information.

9. A system for processing information received by a wireless device via a server over a computer network, comprising:
   a parser located at said server, receiving information from a web site over said computer network and parsing at least some of said information; and
   a display engine located at said server, employing at least some results of said parsing to provide said information in a form suitable for display to a user on said wireless device, by classifying said information and formatting said information according to its importance to a user.

10. A system for processing information received by a wireless device according to claim 9, wherein said wireless device is a wireless telephone and wherein at least some results of said parsing are employed at said server to provide said information in a form suitable for display to a user on said telephone.

11. A system processing information received by a wireless device according to claim 9, and wherein said wireless device is a wireless personal digital assistant and wherein at least some results of said parsing are employed at said server to provide said information in a form suitable for display to a user on said personal digital assistant.

12. A system for processing information received by a wireless device according to claim 9, and wherein said wireless device is a wireless telephone and personal digital assistant and wherein at least some results of said parsing are employed at said server to provide said information in a form suitable for display to a user on said telephone and personal digital assistant.

13. A system for processing information according to claim 9 and wherein at least some of the results of the parsing are employed at said server for classifying said information according to its importance to a user in accordance with user-selected importance criteria and wherein said display of said information is at least partially in accordance with results of said classifying of said information.

14. A system for processing information according to claim 10 and wherein at least some of the results of the parsing are employed at said server for classifying said information according to its importance to a user in accordance with user-selected importance criteria and wherein said display of said information is at least partially in accordance with results of said classifying of said information.

15. A system for processing information according to claim 11 and wherein at least some of the results of the parsing are employed at said server for classifying said information according to its importance to a user in accordance with user-selected importance criteria and wherein said display of said information is at least partially in accordance with results of said classifying of said information.

16. A system for processing information according to claim 12 and wherein at least some of the results of the parsing are employed at said server for classifying said information according to its importance to a user in accordance with user-selected importance criteria and wherein said display of said information is at least partially in accordance with results of said classifying of said information.

* * * * *